US012802025B2

(12) United States Patent
Olive et al.

(10) Patent No.: US 12,802,025 B2
(45) Date of Patent: Nov. 17, 2026

(54) MULTI-ENTITY ADAPTIVE TRIP ACTIVITY AND DATA SECURITY MANAGEMENT SYSTEM

(71) Applicant: Honeywell International Inc., Charlotte, NC (US)

(72) Inventors: Michael Olive, Cockeysville, MD (US); Rajeev Mohan, Bengaluru (IN); Sudhir Hebbar, Bengaluru (IN)

(73) Assignee: Honeywell International Inc., Charlotte, NC (US)

(*) Notice: Subject to any disclaimer, the term of this patent is extended or adjusted under 35 U.S.C. 154(b) by 0 days.

(21) Appl. No.: 18/610,426

(22) Filed: Mar. 20, 2024

(65) Prior Publication Data

US 2025/0173631 A1 May 29, 2025

(30) Foreign Application Priority Data

Nov. 29, 2023 (IN) ............................ 202311080974

(51) Int. Cl.
*G06Q 10/083* (2024.01)

(52) U.S. Cl.
CPC .............................. *G06Q 10/08355* (2013.01)

(58) Field of Classification Search
CPC .................................................... G06Q 10/025
See application file for complete search history.

(56) References Cited

U.S. PATENT DOCUMENTS 7,242,311 B2 7/2007 Hoff et al.
9,489,852 B1 11/2016 Chambers et al.
(Continued)

FOREIGN PATENT DOCUMENTS

JP 2021-036452 A 3/2021
WO WO-2009088538 A1 * 7/2009 ......... G06K 17/0022
WO 2023/168185 A1 9/2023

OTHER PUBLICATIONS

T. Primya, G. Kanagaraj, K. S, K. VK and N. S, "GenAI-powered Itinerary Planner," 2025 3rd International Conference on Advancements in Electrical, Electronics, Communication, Computing and Automation (ICAECA), Coimbatore, India, 2025, pp. 1-6, doi: 10.1109/ICAECA63854.2025.11012327. (Year: 2025).*

(Continued)

*Primary Examiner* — George Chen
*Assistant Examiner* — Danielle Elizabeth Zevitz
(74) *Attorney, Agent, or Firm* — Alston & Bird LLP

(57) ABSTRACT

Embodiments described herein provide a trip plan management system configured to facilitate the execution of various trip activities associated with multiple respective entities by a vehicle. Embodiments may receive a plurality of trip activity requests and generate a plurality of trip activities. Embodiments may also generate a trip plan based on the plurality of trip activities based on a plurality of trip activity parameters associated with each respective trip activity. Embodiments may also generate at least a first rule set based on the plurality of trip activities, where the first rule set is generated based on at least one of a condition set or an action sequence associated with at least one trip activity of the plurality of trip activities. Embodiments may also cause the vehicle to execute the trip plan based on the first rule set by inputting the trip plan and the first rule set into the vehicle.

20 Claims, 9 Drawing Sheets

(56) References Cited

U.S. PATENT DOCUMENTS

| | | | | |
|---|---|---|---|---|
| 11,008,098 | B2 | 5/2021 | Zhang et al. | |
| 11,025,598 | B1 * | 6/2021 | Laghaeian | H04L 63/0435 |
| 11,501,483 | B2 | 11/2022 | Speasl et al. | |
| 2014/0018979 | A1 | 1/2014 | Goossen et al. | |
| 2016/0363929 | A1 | 12/2016 | Clark et al. | |
| 2019/0266559 | A1 * | 8/2019 | High | G06Q 10/0834 |
| 2020/0258400 | A1 | 8/2020 | Yuan et al. | |
| 2020/0327483 | A1 * | 10/2020 | Yoshizawa | H04L 67/62 |
| 2021/0116940 | A1 * | 4/2021 | Fukunaga | G06Q 10/06316 |
| 2021/0304620 | A1 | 9/2021 | Selvarajan et al. | |
| 2021/0365043 | A1 * | 11/2021 | Chan | G08G 1/164 |
| 2022/0013015 | A1 | 1/2022 | J et al. | |
| 2022/0351626 | A1 | 11/2022 | Ali et al. | |
| 2022/0351628 | A1 | 11/2022 | Ali et al. | |
| 2022/0364866 | A1 | 11/2022 | Williams et al. | |
| 2023/0259925 | A1 * | 8/2023 | Wu | G06Q 20/108<br>705/71 |

OTHER PUBLICATIONS

Extended European Search Report Mailed on Feb. 7, 2025 for EP Application No. 24198485, 9 page(s).

* cited by examiner

MULTI-ENTITY ADAPTIVE TRIP ACTIVITY AND DATA SECURITY MANAGEMENT SYSTEM

STATEMENT REGARDING FEDERALLY SPONSORED RESEARCH OR DEVELOPMENT

This invention was made with Government support under 697DCK-22-C-00265 awarded by Federal Aviation Administration. The Government has certain rights in the invention.

CROSS-REFERENCE TO RELATED APPLICATIONS

This application claims priority to and the benefit of Indian Provisional Patent Application Serial Number 202311080974, filed on Nov. 29, 2023, the contents of which are incorporated herein by reference in their entirety.

TECHNICAL FIELD

Embodiments of the present disclosure generally relate to an adaptive trip activity and data security management system configured to facilitate the execution of various trip activities associated with multiple respective entities by a vehicle.

BACKGROUND

In various contexts, trip plans are configured to be executed by a single vehicle to meet the needs of a single entity. Inventors have discovered various problems with various implementations of trip activity and data security management systems. Through applied effort, ingenuity, and innovation, the inventors have solved many of these problems by developing the solutions embodied in the present disclosure, the details of which are described further herein.

BRIEF SUMMARY

In general, embodiments of the present disclosure herein provide enhanced runway condition assessment and vehicle landing safety for one or more vehicles. Other implementations will be, or will become, apparent to one with skill in the art upon examination of the following figures and detailed description. It is intended that all such additional implementations be included within this description be within the scope of the disclosure and be protected within the scope of the following claims.

In accordance with a first aspect of the present disclosure, a computer-implemented method for enabling adaptive trip activity and data security management in order to facilitate the execution of various trip activities associated with multiple respective entities by a vehicle during execution of a respective trip plan is provided. The computer-implemented method is performable by one or more specially configured computing device(s) embodied in hardware, software, firmware, and/or any combination thereof, for example as described herein. In one example embodiment, the example computer-implemented method includes receiving, based on interactions with a cloud-based user interface associated with a trip plan management system, a plurality of trip activity requests associated with a plurality of entities. The example computer-implemented method also includes generating, based on the plurality of trip activity requests, a plurality of trip activities, wherein the plurality of trip activities comprises at least a first trip activity associated with a first entity of the plurality of entities and a second trip activity associated with a second entity of the plurality of entities. The example computer-implemented method also includes generating a trip plan based on the plurality of trip activities, wherein generating the trip plan comprises determining, based on a plurality of trip activity parameters associated with each respective trip activity of the plurality of trip activities, that at least the first trip activity and the second trip activity can be feasibly executed during the trip plan. The example computer-implemented method also includes generating at least a first rule set based at least in part on the plurality of trip activities. The example computer-implemented method also includes causing a vehicle to execute the trip plan based on the first rule set by at least providing the trip plan and the first rule set to the vehicle.

The example computer-implemented method further includes wherein each respective trip activity of the plurality of trip activities is associated with at least one of a condition set, an action sequence, or a user-selected encryption model.

The example computer-implemented method further includes, in response to execution of the action sequence associated with the first trip activity, causing transmission of activity data related to the action sequence from the vehicle to a user computing device associated with the first entity, wherein the vehicle is configured to encrypt the activity data based on the user-selected encryption model associated with the first trip activity.

The example computer-implemented method further includes receiving, based on interactions with the cloud-based user interface associated with the trip plan management system, a selection indication associated with the user-selected encryption model associated with the first trip activity, wherein the user-selected encryption model is a first encryption model of a plurality of encryption models.

The example computer-implemented method further includes wherein the plurality of encryption models comprises at least one of a symmetric encryption model, an asymmetric encryption model, a block cypher encryption model, a stream cipher encryption model, or an image encryption model.

The example computer-implemented method further includes receiving, during execution of the trip plan, a trip activity modification request associated with the first entity, wherein the trip activity modification request is associated with one or more updates to the first trip activity. The example computer-implemented method also includes, in response to determining that the trip activity modification request does not adversely impact the execution of the trip plan by the vehicle, generating a second rule set based on the trip activity modification request, wherein the second rule set is generated based on at least one of a modified condition set or a modified action sequence associated with the trip activity modification request. The example computer-implemented method also includes causing, based on the second rule set and by at least inputting the second rule set into the vehicle, the vehicle to update the execution of the trip plan to execute the trip activity modification request during the execution of the trip plan.

The example computer-implemented method further includes causing a second vehicle to execute a second trip plan based on a second rule set by inputting the second trip plan and the second rule set into the second vehicle, wherein the second trip plan and the second rule set are generated based on determining a first subset of trip activities of the plurality of trip activities that can be feasibly executed during the second trip plan. The example computer-implemented method also includes causing a third vehicle to execute a third trip plan based on a third rule set by inputting the third trip plan and the third rule set into the third vehicle, wherein the third trip plan and the third rule set are generated based on determining a second subset of trip activities of the plurality of trip activities that can be feasibly executed during the third trip plan.

The example computer-implemented method further includes wherein the plurality of trip activity parameters associated with each respective trip activity of the plurality of trip activities comprise at least one of a date and time, a geographic region, preferred weather conditions, vehicle hardware requirements, or vehicle sensor requirements associated with each respective trip activity of the plurality of trip activities.

In accordance with a second aspect of the disclosure, a computer program product for providing enabling adaptive trip activity and data security management in order to facilitate the execution of various trip activities associated with multiple respective entities by a vehicle during execution of a respective trip plan is provided. In one example embodiment computer program product, the computer program product includes at least one non-transitory computer-readable storage medium having computer program code stored thereon that, in execution with at least one processor, configures the computer program product for performing any one of the example computer-implemented methods described herein.

In accordance with a third aspect of the disclosure, an apparatus for enabling adaptive trip activity and data security management in order to facilitate the execution of various trip activities associated with multiple respective entities by a vehicle during execution of a respective trip plan is provided. In one example embodiment, the apparatus includes at least one processor and at least one memory having computer-coded instructions stored thereon, where the computer-coded instructions in execution with the at least one processor causes the apparatus to perform any one of the example computer-implemented methods described herein. In a second example embodiment apparatus, the apparatus includes means for performing each step of any one of the example computer-implemented methods described herein.

The above summary is provided merely for the purpose of summarizing some example embodiments to provide a basic understanding of some aspects of the present disclosure. Accordingly, it will be appreciated that the above-described embodiments are merely examples and should not be construed to narrow the scope or spirit of the present disclosure in any way. It will be appreciated that the scope of the present disclosure encompasses many potential embodiments in addition to those here summarized, some of which will be further described below. Other features, aspects, and advantages of the subject will become apparent from the description, the drawings, and the claims.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
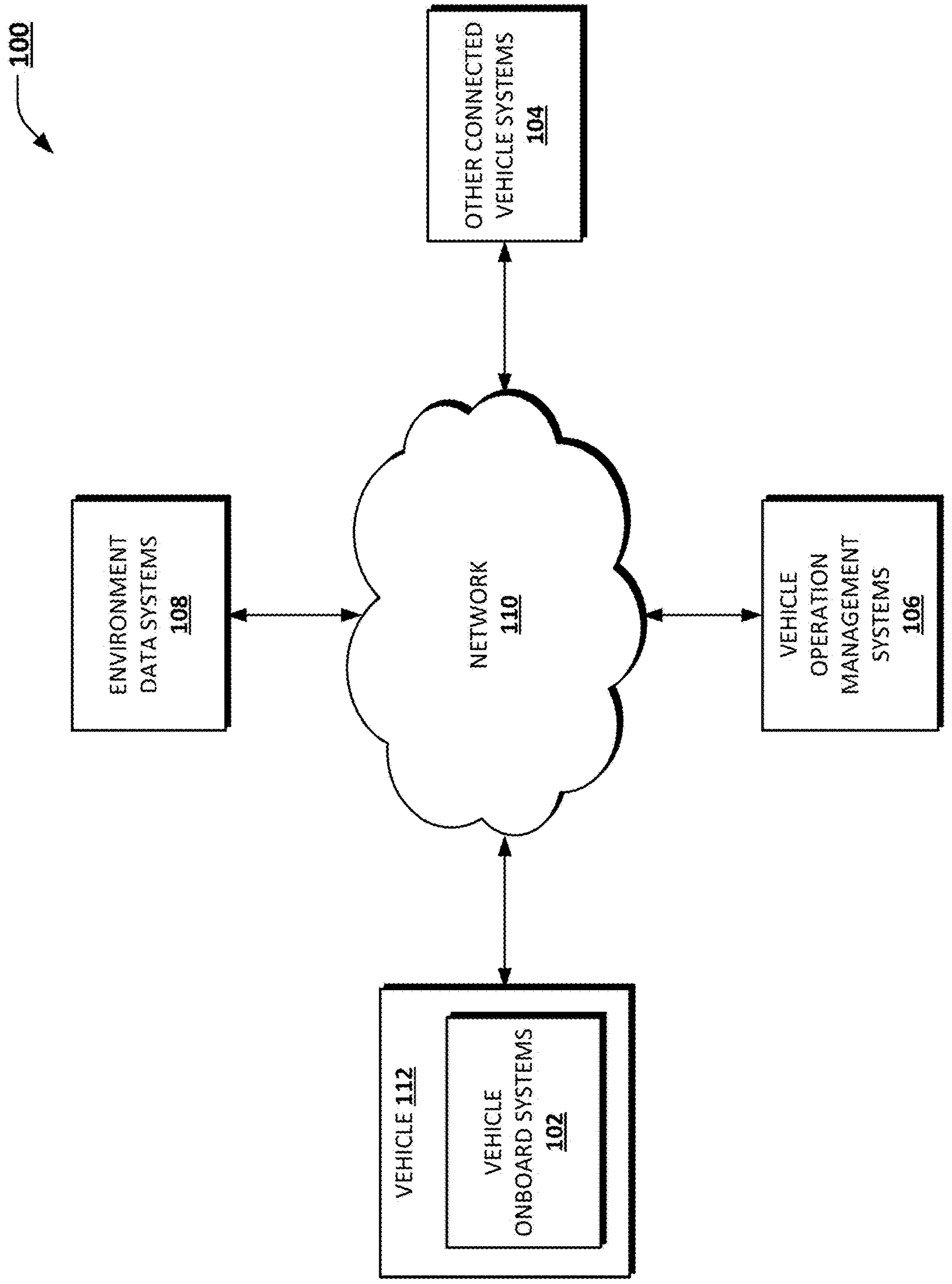
FIG. 1 illustrates an example system that enables adaptive trip activity and data security management for multiple respective entities in accordance with at least some example embodiments of the present disclosure.

Embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein, rather, these embodiments are provided so that this disclosure will satisfy applicable legal requirements. Like numbers refer to like elements throughout.

Overview

In various contexts, autonomous or semi-autonomous vehicles are deployed to conduct various tasks. For example, in the aerospace domain, unmanned vehicles (e.g., unmanned aircraft systems (UAVs), urban air mobility (UAM) vehicles, etc.) may execute trip plans that have objectives to be achieved for a respective entity (e.g., an enterprise, organization, business, service provider, client, end user, etc.). A trip plan may comprise a travel path to be traversed by an unmanned vehicle (e.g., a UAV) and a set of trip activities the UAV is intended to perform at specific points during the trip plan. In a typical scenario, a trip activity (e.g., an imaging activity, chemical spraying activity, data collection activity, etc.) is scheduled to be performed at a particular location or area along the travel path.

Such trip plans are typically undertaken on a standalone basis. For example, a vehicle will typically perform a specific set of trip activities for a single entity, and relevant data may be transferred to the particular entity either during execution of the trip plan or after the vehicle has completed the trip plan. In the future, as autonomous and semi-autonomous vehicle technologies continue to advance, and as extended vehicle technologies are adopted by various enterprises, the number of desired trip plans will continue to grow. Furthermore, the future integration of autonomous and semi-autonomous vehicles (e.g., UAVs, UAMs, etc.) into the national airspace system (NAS) will require significant advances in security, data privacy, and safety requirements.

Existing vehicle trip plan management solutions are deficient in many aspects. For example, in various existing solutions, dynamic entity trip activity updates are not possible, and entities are unable to update a trip activity dynamically once a respective trip plan is initiated. Additionally, existing solutions lack efficient method for managing multiple trip plan service provider responsibilities. For example, a trip plan service provider must understand execution details for every type of trip activity while also providing primary trip plan services (e.g., trip planning, safety operations, trip data security operations, etc.). Such deficiencies lead to high operating costs and/or excess consumption of technological resources. For example, vehicles conventionally execute trip plans that are uniquely tailored to the needs of a single entity. If a similar need exists for another entity, a separate trip plan is undertaken, leading to excess technological resource consumption. It is therefore technically challenging to group multiple trip activities associated with multiple respective entities together on the same trip plan.

Furthermore, each of the trip activities associated with the trip plan may have variable entity-specific data security needs. In this regard, existing vehicle trip plan management solutions are deficient in many data security aspects related to data interception, data integrity, denial of service, and/or data privacy issues. For example, wireless transmission of trip activity data from vehicles may be intercepted by unauthorized actors. Such data may comprise sensor readings, photographs, video feeds and/or any other sensitive information resulting in severe security compromises. As another example, the accuracy and reliability of the data collected during execution of a trip plan may be compromised through manipulation and/or altering by malicious actors. As yet another example, a datalink between a respective vehicle and a ground control station may be disrupted by malware and/or malicious actors configured to overwhelm the communication systems of the vehicle with excessive traffic and/or malicious inputs. As yet another example, sensitive data collected during execution of a trip plan for a particular entity could end up in the hands of another entity who relies on a same trip plan management service.

Embodiments of the present disclosure are configured to address the aforementioned technical challenges and improve upon the deficiencies of various existing solutions by providing a trip plan management system that enables the decoupling of a trip plan from the trip activities being performed during the trip plan. As such, embodiments of the present disclosure enable the associated entities to be in control of their respective trip activities, activity data integrity, and/or privacy requirements. Furthermore, embodiments of the present disclosure may be configured to dynamically update a trip plan being executed based on changing circumstances, where the entities associated with the trip plan are given control to decide and act on respective trip activities based on various safety and security requirements. Embodiments of the present disclosure may thus be configured to facilitate the dynamic performance of various trip activities for multiple entities during the execution of a single, respective trip plan.

As will be appreciated, embodiments of the present disclosure provide a plurality of technical benefits and improvements upon existing solutions. For example, embodiments of the present disclosure enable multiplexing of a trip plan for more than one entity, where each entity has its own specific trip activities to be performed, with unique entity-specific data privacy and protection needs. As such, embodiments enable the decoupling of a trip plan executed by a vehicle and the entity-specific trip activities the vehicle performs.

Embodiments of the present disclosure also provide the technical benefit of providing entities the ability to control the trip activities to be performed during the execution of a trip plan along with the ability to dynamically alter the trip activities during the execution of the trip plan. Furthermore, embodiments of the present disclosure also provide the technical benefit of enabling trip plan management service providers to limit their focus to the primary task of executing a trip plan and providing a trip plan management system where trip activities associated with one or more respective entities can be generated and/or initiated via a user interface displayed via one or more entity computing devices associated with the one or more respective entities.

By way of example, embodiments of the present disclosure may be configured to generate a trip plan comprising trip activities associated with three separate entities, Entity A, Entity B, and Entity C, where the three separate entities have no affiliation with one another. Each of the three entities may, in a given scenario, generate respective trip activities that need to be executed within a similar geographic region. For example, Entity A may generate, via the trip plan management system, a trip activity associated with capturing one or more images related to the structural components of a bridge in a particular geographic area for use in an inspection. Entity B may generate, via the trip plan management system, a trip activity associated with collecting video data related to a power line network with infrastructure in the same particular are. Entity C may generate, via the trip plan management system, a trip activity associated with spraying a chemical over a particular section of crops nearby the same particular geographic region.

In such a scenario, none of the three separate entities may be aware that their requested trip activities are to be executed within a relative range of the same geographic region. However, the trip plan management system may generate a trip plan comprising the trip activities associated with the three separate entities to be executed by a single vehicle equipped with the necessary hardware and/or software components to capture the requested data and/or execute the requested operations for the respective entities. In this regard, one or more trip activities for each of one or more separate entities may be distributed across a particular set of vehicles for performing the one or more trip activities. Furthermore, embodiments of the present disclosure may be configured to encrypt any trip activity data generated during execution of a respective trip activity based on an entity-selected encryption model and transmit the encrypted activity data directly to the respective entity. In this manner, embodiments of the present disclosure are configured to ensure the security and privacy of the trip activity data associated with each of the three separate entities while efficiently reducing the consumption of various technological resources expended to operate each of the one or more vehicles for performing the trip activities.

It will be appreciated that embodiments of the present disclosure may be advantageous for each of a number of vehicle types. In this regard, aerial vehicles are utilized as an exemplary type of vehicle for purposes of simplifying the disclosure. The description specific to aerial vehicles should not limit the scope and spirit of the disclosure unless otherwise explicitly stated. For example, the methods described herein may be applicable to the fields of autonomous automobile operation, autonomous watercraft operation, and/or the like.

Definitions

"Trip plan management system" refers to a system of one or more computing devices embodied in hardware, software, firmware, and/or any combination thereof, that is distributed or centralized, and that is configured to facilitate adaptive trip activity and data security management for multiple respective entities (e.g., multiple respective enterprises, organizations, businesses, service providers, clients, end users, etc.). For example, components of the trip plan management system are configured to facilitate the execution of various trip activities associated with multiple respective entities by a vehicle (e.g., an autonomous or semi-autonomous vehicle) during execution of a single, respective trip plan.

A trip plan management system, in some contexts, is associated with a trip plan management service provider configured to provide adaptive trip activity and data security management for one or more respective entities via a user interface and/or application instance associated with the trip plan management system. Additionally or alternatively, a trip plan management system is associated with one or more enterprises such as, for example, a logistics enterprise, a delivery and shipment enterprise, a commercial airline, an aerial delivery enterprise, an urban air mobility (UAM) enterprise, an advanced air mobility (AAM) enterprise, and/or the like that manages and/or deploys a fleet of vehicles. The trip plan management system in some contexts includes and/or integrates with one or more computing systems, computing devices, services, and/or datastores. For example, the trip plan management system may interface with one or more vehicle operation management systems, environment data systems, air traffic control systems, UAM systems, and/or the like. In some embodiments, the trip plan management system is configured as a distributed management system configured to be communicably coupled with one or more vehicles, one or more entity computing devices, and/or one or more systems (e.g., vehicle operation management systems, and/or environment data systems).

The trip plan management system is configured to employ rules-based ML model techniques configured to automatically receive, retrieve, generate, and/or otherwise process data related to one or more trip activities associated with one or more respective entities, one or more trip plans associated with the one or more trip activities, and/or one or more encryption models. The trip plan management system may be configured to host computations that are remotely configured, executed, and/or broadcast to one or more vehicle systems and/or components associated with one or more respective vehicles. For example, the trip plan management system and one or more communication managers associated with one or more respective vehicles remain in constant contact and are configured to transmit and/or receive data related to the operation of the one or more vehicles via a communications network. The trip plan management system comprises one or more computing devices and/or one or more datastores configured to monitor and/or manage the adaptive trip activity and data security for one or more respective entities.

"Onboard trip activity manager" refers to hardware, software, firmware, and/or a combination thereof, that integrates with one or more vehicle systems and/or apparatuses associated with a vehicle related to the trip plan management system. The onboard trip activity manager comprises, and/or integrates with, among other components, a communication manager, an entity-specific encryption database, a rules engine, a rules database, one or more vehicle onboard systems, a vehicle apparatus, and/or one or more sensors configured to facilitate the safe and secure execution of one or more trip activities associated with a respective trip plan. In this regard, the onboard trip activity manager comprises, embodies, and/or otherwise integrates with one or more of a vehicle state evaluation manager, a command interpreter, a command executor, a data manager, a data encryption manager, and/or one or more vehicle system software development kits (SDKs).

The onboard trip activity manager, in some contexts, integrates with, or is embodied by, a computing device such as a line replaceable unit (LRU). For example, the onboard trip activity manager in some contexts is embodied by an aerospace gateway LRU configured to communicate with one or more vehicle systems. In various embodiments, the onboard trip activity manager may integrate with, or is embodied by, a computing device such as a line replaceable unit (LRU) associated with a vehicle, a gateway computing device, a legacy computing device, a flight management system, a takeoff and landing data (TOLD) application, and/or any other combination of computing hardware and/or software associated the vehicle.

In this regard, the onboard trip activity manager associated with a respective vehicle may transmit one or more portions of data to one or more computing devices associated with the trip plan management system through a communications network (e.g., via a communication manager associated with the vehicle). For example, the onboard trip activity manager in some embodiments is configured to transmit one or more portions of data related to a status of one or more trip activities, one or more portions of encrypted activity data associated with the one or more trip activities, one or more portions of data related to a rules engine, a current vehicle state, and/or operation of the vehicle.

In various embodiments, a trip plan management apparatus of the trip plan management system may be configured to execute one or more operations associated with the onboard trip activity manager. For example, in various contexts, the trip plan management apparatus may be configured to perform at least a portion of the processing associated with the onboard trip activity manager associated with a vehicle (e.g., an unmanned aerial vehicle). As such, the computational resources needed by the vehicle may be advantageously reduced. Furthermore, in some embodiments, the functionality of the trip plan management system is instead provided via the onboard trip activity manager for a particular vehicle (e.g., via an application instance associated with the trip plan management system).

"Trip activity" refers to an electrically managed data structure that includes data related to a particular action or sequence of actions that are to be executed by a respective vehicle during the execution of a trip plan. A trip activity can be associated with various types of actions, commands, procedures, and/or operations to be executed by one or more hardware and/or software components of a respective vehicle. Non-limiting types of trip activities comprise an image capture trip activity (e.g., the capture of image data related to buildings and/or critical infrastructure, image data used for terrain mapping, etc.), a video capture trip activity (e.g., the capture of video data for broadcasting events, entertainment, search-and-rescue missions, security, etc.), a sensor data collection trip activity (e.g., the capture of a measurement and/or collection of sensor data (e.g., temperature, humidity, air-quality, etc.)), a parcel delivery trip activity (e.g., the transport and/or delivery of a payload at a particular location), and/or a chemical distribution trip activity (e.g., the spraying of pesticides over a particular geographic region).

In various embodiments, a trip activity comprises and/or is otherwise associated with a condition set, an action sequence, and/or an entity-selected encryption model. A condition set is a list of conditions that must be met in order to execute and/or initiate execution of a particular action sequence associated with a respective trip activity. An action sequence is a set of actions, commands, operations, and/or the like to be performed by a respective vehicle and/or one or more components of the respective vehicle. For example, an action sequence may be associated with a particular trip activity type (e.g., an image capture trip activity). In some embodiments, an action sequence is associated with an action definition and/or an action postcondition generated by a respective entity. An action definition is associated with one or more commands and/or operations to be performed on behalf of the entity. In some embodiments, an action postcondition associated with an action sequence includes one or more commands and/or operations related to a post-processing, quality control, and/or data encryption operation related to one or more portions of trip activity data generated during the execution of an action definition.

In some embodiments, trip activity data encryption is also performed as part of an action postcondition. For example, in some embodiments, a data encryption manager associated with the onboard trip activity manager is configured to encrypt one or more portions of trip activity data generated by the vehicle based on an entity-selected encryption model (e.g., an asymmetric data encryption model) associated with a respective trip activity. For example, one or more portions of trip activity data may be encrypted based on an encryption key associated with a respective entity. The onboard trip activity manager can, via a communication manager, transmit the encrypted activity data directly to the respective entity (e.g., directly to a client supplied URL). Additionally or alternatively, the onboard trip activity manager can, via a communication manager, transmit the encrypted activity data to a server system to which the entity has exclusive access. This ensures entity control of data security and privacy.

In addition to a condition set, action sequence, and/or entity-selected encryption model, a trip activity is associated with one or more trip activity parameters. In various embodiments, the one or more trip activity parameters represent one or more constraints that are used to determine which type of vehicle is required to execute a respective trip activity, which hardware and/or software components are required to execute a respective trip activity, as well as to facilitate the grouping of trip activities associated with various entities into a respective trip plan by the trip plan management system. For example, in various embodiments, the one or more trip activity parameters include, but are not limited to, a date and time, a geographic region, one or more preferred weather conditions, one or more vehicle hardware requirements, and/or one or more vehicle sensor requirements necessary to execute a respective trip activity.

In some embodiments, a trip activity is generated by a trip plan management system based on a respective trip activity request received by an entity computing device associated with a particular entity. In various embodiments, a trip activity request may comprise and/or otherwise be associated with one or more portions of data related to a condition set, action sequence, and/or entity-selected encryption model generated, selected, and/or otherwise indicated by a particular entity. In some embodiments, a trip activity request is generated via a cloud-based user interface and/or application instance associated with the trip plan management system. In various embodiments, one or more commands, operations, and/or portions of executable program code associated with a trip activity, trip activity request, and/or action sequence are configured to invoke one or more application programming interface (API) services from the cloud (e.g., one or more services associated with the trip plan management system, one or more data encryption services, one or more entity verification services, etc.).

"Trip plan" refers to an electronically managed data structure generated by the trip plan management system based on an activity list including any number of trip plan activities associated with any number of respective entities. There are several techniques that can be used to generate a trip plan. For example, in some embodiments, a trip plan is automatically generated using various machine learning models and/or deterministic models (e.g., a genetic algorithm). In some embodiments, a trip plan is generated based on a hybrid approach (e.g., a supervised approach, supervised model, etc.). In various other embodiments, a trip plan is manually generated via one or more interactions with a user interface and/or application instance associated with the trip plan management system.

In various contexts, a trip plan is generated based on one or more of a condition set, an action sequence, an entity-selected encryption model, and/or one or more trip activity parameters associated with the one or more trip activities comprised in the activity list. For example, the trip plan management system may generate a particular trip plan comprising a plurality of trip activities, where the plurality of trip activities are selected based on the one or more trip activity parameters associated with each trip activity of the plurality of trip activities. In various embodiments, the one or more trip activity parameters include, but are not limited to, a date and time, a geographic region, one or more preferred weather conditions, one or more vehicle hardware requirements, and/or one or more vehicle sensor requirements necessary to execute a respective trip activity.

As such, in some embodiments, a trip plan is generated based on several factors such as the required date and time of the one or more respective trip activities to be executed, the geographic region where the one or more respective trip activities are to take place, the geographic proximities for which the one or more respective trip activities are to be performed, the current weather conditions the geographic region, and/or the trip activity parameters imposed by the one or more respective trip activities to be performed (e.g., the necessary vehicle systems required, a required camera resolution for capturing image data, the various sensors equipped on the respective vehicle, etc.). In some embodiments, a trip plan comprises one or more trip plan waypoints, and/or one or more activity locations that make up the general travel path of the trip plan that a vehicle will follow while executing one or more trip activities. In various contexts, one or more trip activities may be associated with a particular trip plan waypoint, or a particular activity location associated with the trip plan.

"Rules engine" refers to one or more statistical, algorithmic, and/or machine learning models associated with a vehicle that is configured to receive, evaluate, enforce, trigger, and/or incorporate one or more rules stored in a rules database that were generated by the trip plan management system based on one or more respective trip plan activities associated with a particular trip plan. The rules engine in some contexts comprises one or more ML models, rule expression models, artificial neural networks (ANNs), recurrent neural networks (RNNs), convolutional neural networks (CNNs), and/or the like.

In various embodiments, the rules engine is configured to receive one or more portions of data related to a current vehicle state related to a respective vehicle to determine whether one or more rule conditions associated with one or more rules comprised in a rules database associated with the vehicle have been satisfied. In response to determining that one or more rule conditions have been satisfied, the rules engine is configured to trigger (e.g., cause execution of) one or more actions of an action sequence associated with a respective trip plan activity. In various embodiments, a rule condition associated with a rule corresponds to one or more respective conditions comprised in a condition set of a respective trip activity.

A rule is an electronically managed data object and/or portion of executable program code generated based on a respective trip activity. In various embodiments, a rule is generated by a rule generator associated with a trip plan management system and is associated with one or more conditions of a condition set of a corresponding trip plan activity. A rules engine may trigger an action (e.g., a portion of executable program code configured to cause operation of one or more systems of a vehicle) associated with an action sequence of a corresponding trip plan activity based on a determination that a corresponding condition has been satisfied. In various embodiments, the determination that the corresponding rule condition has been satisfied is based on an evaluation of a current vehicle state associated with the vehicle. Upon determining, based on the current vehicle state, that a rule condition has been satisfied, the rules engine may cause a trip plan activity manager to initiate and/or cause execution of one or more commands, operations, instructions, and/or actions associated with the corresponding trip plan activity.

In various embodiments, a rule condition associated with a rule (e.g., and therefore a condition comprised in a condition set 314 associated with a respective trip activity 312*a*) represents an operational constraint, limit, parameter threshold, guideline, and/or the like that in some contexts is defined to govern one or more operations, systems, components, and/or environments associated with a particular vehicle. Based in part on one or more rules associated with the particular vehicle, the rules engine, in conjunction with a vehicle state evaluation manager of the trip plan activity manager, can determine whether one or more conditions have been violated or satisfied by one or more vehicle systems and/or an environment associated with the vehicle.

In various embodiments, a condition defines a threshold data value and/or data range which in some contexts is used to determine whether a particular rule has been violated, satisfied, exceeded, and/or otherwise triggered. As a non-limiting example, a rule may define a threshold (e.g., a particular data value and/or data range) related to a relative distance of a vehicle to a respective trip plan waypoint, activity location, and/or object of interest. If the rules engine determines that the vehicle is within the threshold related to a relative distance of the vehicle to a respective trip plan waypoint, activity location, and/or object of interest (and therefore has satisfied the corresponding condition), the rules engine can cause execution of one or more corresponding actions associated with a particular trip plan activity associated with the rule. For example, the rules engine is configured to generate and/or transmit a rule action command to a command interpreter of the onboard trip activity manager which causes execution of one or more actions associated with an action sequence corresponding to a particular trip plan activity.

"Communication manager" refers to hardware, software, firmware, and/or a combination thereof, that integrates with one or more vehicle systems and/or apparatuses associated with a vehicle related to the trip plan management system to facilitate data communications to and/or from the vehicle. The communication manager associated with a respective vehicle is configured to receive, transmit, store, manage, and/or otherwise process one or more portions of data associated with the respective vehicle. For example, the communication manager is configured to receive and/or transmit one or more portions of data related to one or more trip activities associated with the respective vehicle (e.g., encrypted activity data). The communication manager integrates with, among other components, an onboard trip activity manager, one or more vehicle onboard systems, a vehicle apparatus, and/or one or more circuitries associated with a vehicle to facilitate the safe and secure execution of one or more trip activities associated with a respective trip plan.

In various embodiments, the communication manager is integrated with the vehicle control circuitry and/or communications circuitry of a vehicle apparatus of a respective vehicle. As such, in various contexts, the communication manager is configured to facilitate one or more communications and/or operations of the vehicle. Additionally or alternatively, in some embodiments, the communications manager is configured to switch between various communications systems associated with the vehicle. For example, the communication manager can determine whether the engage one or more of a satellite communications system, cellular communications system, C-band-based communications system, datalink communications system, and/or the like.

In various contexts, the communication manager may determine to switch from a first communication system to a second communication system based on one or more of a signal strength, channel quality, radio interference, channel-quality indicator (CQI) metric, signal-to-noise ratio (SNR) value, data transmission rate, radio frequency measurement, and/or the like associated with the first and/or second communication system. For example, if the communication manager determines that a signal strength associated with the first communication system (e.g., a cellular communication system) is dropping, failing, and/or not meeting predetermined channel quality standards, the communication manager may switch to the second communication system (e.g., a satellite communications system).

Additionally or alternatively, the communication manager a may switch from a first communication system to a second communication system based on a known communications gap (e.g., a known lack of communications capabilities) associated with a particular geographical region. For example, if the communication manager determines that a vehicle is to be traversing a geographic region lacking a particular type of communications service (e.g., cellular service), the communication manager may switch to a communications system that will work sufficiently in that geographic region in order to preserve communications with the trip plan management system.

"Vehicle state evaluation manager" refers to hardware, software, firmware, and/or a combination thereof, that integrates with an onboard trip activity manager to determine or otherwise identify data associated with a current operational state of a vehicle. In various embodiments, the vehicle state evaluation manager may be configured to receive one or more portions of vehicle operation data and/or vehicle sensor data generated by one or more vehicle onboard systems and/or sensors associated with the vehicle. Based at least in part on the one or more portions of vehicle operation data and/or vehicle sensor data, the vehicle state evaluation manager may be configured to generate a current vehicle state associated with the vehicle. In various contexts, the current vehicle state is configured to describe the current status, operational parameters, data values, operational modes, and/or configurations of one or more vehicle systems (e.g., vehicle onboard systems) associated with the vehicle.

"Command interpreter" refers to hardware, software, firmware, and/or a combination thereof, that integrates with an onboard trip activity manager identify and/or otherwise determine a particular activity to be executed by a vehicle. In various embodiments, the command interpreter is configured to receive, parse, and/or otherwise process data related to a rule action command generated by the rules engine. For example, in various contexts, the command interpreter may determine, based on the rule action command, that the vehicle is meant to begin capturing image data of an object of interest located in a current location of the vehicle (e.g., an activity location). As such, the command interpreter may direct the command executor to cause execution of one or more actions (e.g., imaging actions) associated with the action sequence corresponding to a particular trip plan activity.

"Command executor" refers to hardware, software, firmware, and/or a combination thereof, that integrates with an onboard trip activity manager to execute one or more particular activities via a vehicle. In some embodiments, the command executor is configured to cause the execution of one or more actions associated with a particular action sequence of a respective trip activity. As such, the command executor may be configured to integrate with, manage, direct, and/or otherwise control one or more vehicle devices, vehicle systems, and/or vehicle components in order to successfully execute the actions comprised in an action sequence. In this regard, the command executor may be configured to interface with one or more vehicle system SDKs associated with the one or more vehicle devices, vehicle systems, and/or vehicle components associated with the vehicle.

"Vehicle system software development kit (SDK)" refers to hardware, software, firmware, and/or a combination thereof, that integrates with an onboard trip activity manager to enable the onboard trip activity manager to control various components of the vehicle in order to facilitate the execution of one or more trip activities. In one or more embodiments, the vehicle system SDKs may be comprised of one or more portions of executable program code configured to control, operate, and/or configure one or more hardware and/or software components, devices, and/or systems associated with the vehicle. Non-limiting examples of vehicle system SDKs include, but are not limited to, SDKs associated with one or more camera and gimbal systems, vehicle sensor systems, parcel delivery systems, chemical sprayer systems, robotics systems, computer vision systems, vehicle onboard systems, and/or the like.

"Data manager" refers to hardware, software, firmware, and/or a combination thereof, that integrates with an onboard trip activity manager in order to compile, organize, and/or otherwise aggregate trip activity data. In various embodiments, the data manager may be configured to receive, retrieve, collect, and/or otherwise compile one or more portions of trip activity data generated during the execution of one or more trip activities initiated by the command executor in conjunction with the vehicle system SDKs. Once a respective trip activity has been successfully completed, the data manager may be configured to transmit the associated trip activity data to the data encryption manager for entity-specific data encryption.

"Data encryption manager" refers to hardware, software, firmware, and/or a combination thereof, that integrates with an onboard trip activity manager. The data encryption manager may be configured to use various parameters associated with an entity-specific encryption model associated with a respective trip activity to encrypt the trip activity data. For example, in some embodiments, the data encryption manager is configured to encrypt one or more portions of trip activity data received from the data manager based on an entity-selected encryption model (e.g., an asymmetric data encryption model) associated with a respective trip activity. For example, one or more portions of trip activity data may be encrypted in order to generate encrypted activity data based on an encryption key associated with a respective entity. In various contexts, the data encryption manager may be configured to store the encrypted activity data in the entity-specific encryption database and/or transmit the encrypted activity data to an entity computing device (e.g., via the communication manager) upon successful encryption.

"Vehicle state" refers to an electronically managed data structure that includes data configured to describe the current status, operational parameters, data values, operational modes, and/or configurations of one or more vehicle systems associated with a vehicle. A current vehicle state is generated by a vehicle state evaluation manager of an onboard trip activity manager based on one or more portions of vehicle operation data and/or one or more portions of vehicle sensor data associated with the respective vehicle.

"Vehicle operation data" refers to electronically managed data that indicates at least one aspect of an operational state of a vehicle or a particular subsystem thereof. Vehicle operation data in some embodiments includes data collected, measured, obtained, generated, and/or otherwise processed by the one or more vehicle systems associated with the vehicle. In various embodiments, one or more portions of vehicle operation data, in some contexts, is received from the trip plan management system via a communications network. In various embodiments, at least a portion of the vehicle operation data is based at least in part on vehicle sensor data collected, measured, calculated, and/or otherwise generated by one or more vehicle onboard systems and/or sensors associated with the vehicle.

"Vehicle sensor data" refers to electronically managed data utilized by a vehicle for operation and that is captured by at least one sensor onboard or otherwise associated with an environment of the vehicle. Vehicle sensor data in some contexts includes, without limitation, any data collected, measured, calculated, and/or otherwise generated by one or more sensors associated with the vehicle.

"Vehicle profile" refers to an electronically managed data structure that includes data related to identification of a vehicle and/or one or more parameters, devices, hardware components, subsystems, and/or capacities associated with the vehicle. A vehicle profile includes one or more portions of data associated with at least one of a vehicle type, a vehicle identifier, a passenger capacity, a total vehicle weight, a vehicle payload capacity, a vehicle fuel capacity, a vehicle fuel type, a vehicle battery system, and/or any descriptive data related to the vehicle such as the status of the vehicle, the available systems of the vehicle, the available hardware components and/or devices of the vehicle, one or more personnel associated with the vehicle, and/or any relevant data related to the various capabilities of the vehicle.

"Travel hub" refers to an environment, space, or other physical location that is configured and/or otherwise arranged to serve in-bounding and/or out-bounding of one or more vehicles. A travel hub may comprise one or more runways, landing pads, launch sites, and/or the like configured to facilitate the landing of one or more types of vehicles. Non-limiting examples of travel hubs include airports, vertiports, helipads, hangars, vehicle fueling stations, vehicle pools, service stations, vehicle maintenance facilities, vehicle manufacturing facilities, vehicle sales facilities, and/or the like. A travel hub may embody, integrate with, and/or host one or more charging facilities, fueling facilities, commercial airline facilities, terminals, and/or the like.

"Vehicle" refers to any machine, apparatus, robot, or other mechanism that facilitates movement from a first location to a second location via any medium. A vehicle may traverse itself, move people, move goods, and/or otherwise traverse any of myriad of things. A vehicle in various contexts traverses through a medium of air, on land, and/or by sea. "Aerial vehicle" refers to any manned or unmanned vehicle capable of air travel. Non-limiting examples of an aerial vehicle include a passenger airplane, a helicopter, an unmanned aerial vehicle, an electric aerial vehicle, an electronic vertical takeoff or landing (eVTOL) aircraft, a jet, a drone, or a quadcopter. At least some aerial vehicles are controllable by systems onboard the aerial vehicle. At least some aerial vehicles are controllable by systems external from the aerial vehicle including, and without limitation, remote control systems, ground systems, and centralized control systems. In various embodiments, an aerial vehicle may be an electric aerial vehicle that is powered partially or completely by a battery system integrated with the electric aerial vehicle.

"Interface element" refers to any interactive element associated with a user interface configured to control, update, initiate, direct, manage, and/or otherwise cause operation of one or more computing devices to execute one or more of the operations described herein. For example, a user interface associated with a trip plan management system application instance may comprise various interface elements configured to execute various operations associated with a trip plan management system. Interface elements may be configured as hard-keyed and/or soft-keyed interactive elements associated with a user interface and/or a computing device associated with a trip plan management system. Examples of interface elements include, but are not limited to, interactive buttons, sliders, hyperlinks, text fields, radio buttons, drop-down menus, interactive lists, touchscreen elements, radial switches, linear switches, and/or the like that are configured to cause execution of one or more portions of computer program code associated with the one or more techniques described herein.

"Trip plan management apparatus" refers to a computer, processor, circuitry, and/or other executor of computer instructions that is embodied in hardware, software, firmware, and/or any combination thereof configured to facilitate the operations associated with a trip plan management system. For example, the trip plan management system employs the trip plan management apparatus to facilitate the generation and/or reception of one or more trip activity requests from one or more respective entity computing devices. Additionally or alternatively, in some embodiments, the trip plan management apparatus is configured to generate one or more interactive user interfaces for rendering on one or more electronic displays associated with the one or more respective entity computing devices and/or the trip plan management system.

For example, in some embodiments, the trip plan management apparatus is configured to generate interactive user interfaces and/or dashboards comprising various interactive interface elements representing data related to the trip plan management system, data related to one or more trip activities, data related to one or more rules engines, data related to one or more onboard trip activity managers, data related to one or more vehicles, data related to the one or more systems integrated with the trip plan management system, and/or data related to the one or more storage systems associated with the trip plan management system. In various examples, the trip plan management apparatus is configured to generate and/or cause generation of the interactive user interfaces and/or dashboards for a trip plan management system application instance associated with respective vehicle. Non-limiting examples of a computing device include a computer, a processor, an application-specific integrated circuit, a field-programmable gate array, a personal computer, a smart phone, a laptop, a fixed terminal, a server, a networking device, and a virtual machine. In some embodiments, a trip plan management apparatus is a computing device that is configured to execute and/or cause execution of the various operations associated with a trip plan management system described herein.

"Entity computing device" refers to a computing device associated with a person, company, or other organizational structure that controls one or more systems. In some embodiments, an entity computing device is associated with particular administrative credentials that define access to operation via a particular system. Non-limiting examples of a computing device include a computer, a processor, an application-specific integrated circuit, a field-programmable gate array, a personal computer, a smart phone, a laptop, a fixed terminal, a server, a networking device, and a virtual machine.

"Executable program code" refers to a portion of computer program code stored in one or a plurality of locations that is executed and/or executable via one or more computing devices embodied in hardware, software, firmware, and/or any combination thereof. Executable program code defines at least one particular operation to be executed by one or more computing devices. In some embodiments, a memory, storage, and/or other computing device includes and/or otherwise is structured to define any amount of executable program code (e.g., a portion of executable program code associated with a first operation and a portion of executable program code associated with a second operation). Additionally or alternatively, in some embodiments, executable program code is embodied by separate computing devices (e.g., a first datastore embodying first portion of executable program code and a second datastore embodying a second portion of executable program code).

"Datastore," "database," and "data lake" refer to any type of non-transitory computer-readable storage medium. Non-limiting examples of a datastore, database, and/or data lake include hardware, software, firmware, and/or a combination thereof capable of storing, recording, updating, retrieving and/or deleting computer-readable data and information. In various embodiments, a datastore, database, and/or data lake in some contexts is a cloud-based storage system accessible via a communications network by one or more components of the various embodiments of the present disclosure.

"Data attribute" refers to electronically managed data representing a variable or particular criteria or property having a particular value or status. In some contexts the value is statically fixed or dynamically assigned. In some embodiments, a data attribute embodies a particular property of a data object.

"Data value" refers to electronically managed data representing a particular value for a particular data attribute, operational parameter, sensor device, and/or the like.

The phrases "in an embodiment," "in one embodiment," "according to one embodiment," and the like generally mean that the particular feature, structure, or characteristic following the phrase in some contexts is included in at least one embodiment of the present disclosure, and in some contexts is included in more than one embodiment of the present disclosure (importantly, such phrases do not necessarily refer to the same embodiment). The word "exemplary" is used herein to mean "serving as an example, instance, or illustration." Any implementation described herein as "exemplary" is not necessarily to be construed as preferred or advantageous over other implementations. If the specification states a component or feature "may," "may," "could," "should," "would," "preferably," "possibly," "typically," "optionally," "for example," "often," or "might" (or other such language) be included or have a characteristic, that particular component or feature is not required to be included or to have the characteristic. Such component or feature in some contexts is optionally included in some embodiments, or it in some contexts is excluded.

As used herein, the terms "data," "content," "digital content," "data object," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

Example Systems, Apparatuses, and Dataflows of the Disclosure

FIG. 1 illustrates an example system that enables adaptive trip activity and data security management for multiple respective entities in accordance with at least some example embodiments of the present disclosure. Specifically, FIG. 1 depicts an example system 100 within which embodiments of the present disclosure may operate to provide an adaptive trip activity and data security management system configured to facilitate the execution of various trip activities associated with multiple respective entities by a vehicle 112 during execution of a respective trip plan. As depicted, the system 100 includes vehicle onboard systems 102 associated with the vehicle 112. Additionally or alternatively, in some embodiments, the vehicle 112 is communicable (e.g., via the vehicle onboard systems 102) with one or more external computing devices and/or systems. For example, in some embodiments, the vehicle onboard systems 102 is optionally communicable with some or all of the other connected vehicle systems 104, vehicle operation management systems 106, and/or environment data systems 108. In some such embodiments, the vehicle onboard systems 102 communicates with the other connected vehicle systems 104, vehicle operation management systems 106, and/or environment data systems 108 via one or more specially configured communications networks, for example the network 110.

In some embodiments, the vehicle onboard systems 102 includes any number of computing devices and/or systems embodied in hardware, software, firmware, and/or a combination thereof, that control, operate, and/or otherwise function onboard a vehicle 112. For example, in some embodiments, the vehicle onboard systems 102 includes one or more physical components of the vehicle 112, including and without limitation one or more displays, flight management systems, vehicle operation management systems, engines, wings, props, motors, antennas, landing gear, braking systems, and/or the like. In some embodiments, the vehicle onboard systems 102 includes one or more sensors that gather, collect, and/or otherwise aggregates sensor data relevant to operation of the vehicle 112, associated with the vehicle 112, and/or otherwise associated with an environment of the vehicle 112.

Additionally or alternatively, in some embodiments, the vehicle onboard systems 102 includes one or more computing devices and/or systems embodied in hardware, software, firmware, and/or a combination thereof, that controls operation of one or more physical components of the vehicle 112. For example and without limitation, in some embodiments the vehicle onboard systems 102 includes computing devices and/or systems that control one or more displays, flight management systems, vehicle operation management systems, engines, wings, props, motors, antennas, landing gear, braking systems, sensors, and/or the like.

Additionally or alternatively, in some embodiments, the vehicle onboard systems 102 includes one or more computing devices and/or systems embodied in hardware, software, firmware, and/or a combination thereof, that generates and/or otherwise causes rendering of one or more user interfaces renderable to one or more displays onboard and/or otherwise associated with the vehicle 112. In some embodiments such computing devices and/or systems specially configure some or all elements of user interfaces to be rendered based at least in part on received data. It should be appreciated that the vehicle onboard systems 102 in some embodiments includes any of a myriad of specially configured computing devices and/or systems that enable the vehicle 112 to operate in a particular manner of airborne travel. For example, in various embodiments, the vehicle onboard systems 102 may include a primary flight display (PFD), an electronic flight bag (EFB), a flight management system (FMS), a gateway computing device, and/or the like. In various embodiments, the vehicle onboard systems 102 associated with a respective vehicle may be configured in a line replaceable unit (LRU).

In some embodiments, the vehicle onboard systems 102 includes one or more personal computers, end-user terminals, monitors, other displays, and/or the like. Additionally or alternatively, in some embodiments, the vehicle onboard systems 102 includes one or more data repository/data repositories embodied in hardware, software, firmware, and/or any combination thereof, to support functionality provided by the vehicle onboard systems 102. For example, in some embodiments, such data repositories provide data storage functionality on the same computing devices and/or other dedicated computing devices of the vehicle onboard systems 102. Additionally or alternatively still, in some embodiments, the vehicle onboard systems 102 includes one or more specially configured integrated systems, circuits, and/or the like that process data received by and/or control one or more other computing devices and/or systems, or physical components, associated with the vehicle 112.

The vehicle 112 may embody any of a myriad of aerial vehicle types. The vehicle 112 includes any number of physical components that enable air travel, including and without limitation props, rotors, engines, wings, and/or the like. Additionally or alternatively, the vehicle 112 includes any number of a myriad of controls for operating the physical components of the vehicle 112 to achieve such airborne travel. For example, in some embodiments, the vehicle 112 includes a forward-flying aerial vehicle. In some embodiments, the vehicle 112 includes a vertical takeoff and landing aerial vehicle. It will be appreciated that the vehicle 112 may be entirely manually controlled, semi-autonomous, or fully autonomous for one or more operations, or any combination thereof. Furthermore, it will be appreciated that the vehicle 112 may be manned or unmanned. Non-limiting examples of a vehicle 112 include a plane generally, a helicopter, a drone, an electric vertical takeoff and landing aircraft (eVTOL), a prop-based aircraft, a jet, and/or the like. Any particular vehicle type utilized in this disclosure is purely illustrative and is not to limit the scope and/or spirit of this disclosure or the appended claims presented herewith.

The other connected vehicle systems 104 includes computing devices, systems, and/or onboard systems of other vehicles communicatively coupled with the vehicle 112 associated with vehicle onboard systems 102. It will be appreciated that the other connected vehicle systems 104 in some embodiments includes computing devices and/or systems of one or more other aerial vehicles of the same type operating within the same environment as the aerial vehicle associated with vehicle onboard systems 102. For example, in some embodiments some of the other connected vehicle systems 104 include computing devices and/or systems of other aerial vehicles in a fleet of a particular type of aerial vehicle. In some such embodiments, sensor data (for example) captured via such other connected vehicle systems 104 similarly may be applicable to the vehicle 112 as well. Additionally or alternatively, in some embodiments, the other connected vehicle systems 104 includes computing devices and/or systems of ground vehicles, other types of aerial vehicles, and/or the like, or any combination thereof.

In some embodiments, the vehicle onboard systems 102 receive data from one or more of the other connected vehicle systems 104 that provides additional context with respect to the environment in which the vehicle 112 associated with vehicle onboard systems 102 is operating. In some contexts, such data includes sensor data that the vehicle onboard systems 102 is able to capture, or in some embodiments includes sensor data not capturable by the vehicle onboard systems 102. For example, in some embodiments, the vehicle onboard systems 102 communicates with the other connected vehicle systems 104 to determine a position of other aerial vehicles, objects, environmental features (e.g., buildings, terrain, and/or the like) within the environment of the aerial vehicle associated with vehicle onboard systems 102, and/or the like. Additionally or alternatively, in some embodiments, the vehicle onboard systems 102 communicate with one or more of the other connected vehicle systems 104 to receive sensor data of a particular data type that is not capturable directly by the vehicle onboard systems 102. For example, in some embodiments, the aerial vehicle associated with the vehicle onboard systems 102 does not include a particular sensor for capturing a particular type of sensor data, and instead receives such data of the particular data type from the other connected vehicle systems 104.

In some embodiments, the vehicle operation management systems 106 includes one or more computing devices embodied in hardware, software, firmware, and/or the like that generate, assign, and/or maintain vehicle operation constraints (e.g., trip plan data, trip activity data, flight plan information, mission goals, etc.) for one or more vehicles. For example, in some embodiments, the vehicle operation management systems 106 include computing devices and/or systems of an air traffic control system and/or other authoritative entity that assigns flight plan information to one or more aerial vehicles. Such information includes, without limitation, flight plan information embodying a visual sight rules (VFR) flight plan, an instrument flight rules (IFR) flight plan, a composite flight plan, and/or the like defining conditions for operating a vehicle 112 within a particular environment. In some embodiments, the vehicle operation management systems 106 captures and/or otherwise obtains particular data for relaying to the vehicle 112.

In some embodiments, the vehicle operation management systems 106 includes one or more application servers, end user terminals, personal computers, mobile devices, user devices, and/or the like that generate, assign, and/or transmit flight plan information to aerial vehicles. Additionally or alternatively, in some embodiments, the vehicle operation management systems 106 includes one or more data repository/repositories embodied in hardware, software, firmware, and/or a combination thereof, that stores flight plan information, links between flight plan information and particular aerial vehicles, and/or the like. In some such embodiments, the flight plan information includes navigational data, environmental data, weather data, and/or obstacle data for one or more environments within which an aerial vehicle is or will be operating. Additionally or alternatively, in some embodiments, the vehicle operation management systems 106 includes one or more computing devices and/or systems that detect and/or monitor operation of one or more aerial vehicles within an environment. For example, in some embodiments, the vehicle operation management systems 106 includes one or more radar systems that monitor one or more environments.

The environment data systems 108 includes one or more computing devices and/or systems that monitor, capture, and/or otherwise store data representing one or more aspects of a real-world environment, objects therein, and/or aerial vehicles therein. In some embodiments, the environment data systems 108 includes one or more data repository/repositories that store weather and/or obstacle data for one or more environments. Additionally or alternatively, in some embodiments, the environment data systems 108 includes one or more data repository/repositories that store data embodying other environmental aspects that interact with or otherwise affect operation of aerial vehicles in an environment, for example the vehicle 112. In some embodiments, the environment data systems 108 includes a satellite system that monitors one or more aspects of an environment, for example a satellite weather provider and/or satellite radio provider to the vehicle 112. Additionally or alternatively still, in some embodiments, the environment data systems 108 embody or include a flight services data provider system (e.g., a Honeywell flight services system). In some embodiments, the environment data systems 108 embodies a subsystem of the vehicle operation management systems 106 and/or other connected vehicle systems 104.

In some embodiments, the environment data systems 108 includes one or more application servers, end user terminals, personal computers, mobile devices, user devices, and/or the like. Additionally or alternatively, in some embodiments, the environment data systems 108 includes one or more database servers specially configured to store data pushed from one or more other computing devices and/or systems. In some embodiments, the environment data systems 108 includes one or more remote and/or cloud computing devices accessible to the vehicle onboard systems 102, other connected vehicle systems 104, and/or vehicle operation management systems 106 over a communications network, such as the network 110. In various embodiments, one or more portions of data associated with the environment data systems 108 may be stored in a datastore associated with the trip plan management system.

In some embodiments the network 110 enables communication between various computing devices and/or systems utilizing one or more combinations of wireless and/or wired data transmission protocols. In this regard, the network 110 in some contexts embodies any of a myriad of network configurations. In some embodiments, the network 110 embodies a public network (e.g., the Internet) in whole or in part. In some embodiments, the network 110 embodies a private network (e.g., an internal network between particular computing devices) in whole or in part. Additionally or alternatively, in some embodiments the network 110 embodies a direct or private connection facilitated over satellite or radio systems that enables long-range communication between aerial vehicles and corresponding grounded systems. In some other embodiments, the network 110 embodies a hybrid network (e.g., a network enabling internal communications between particular connected computing devices and external communications with other computing devices).

The network 110 in some embodiments includes one or more base stations, relays, routers, switches, cell towers, communications cables, satellites, radio antennas and/or related control systems, and/or associated routing stations, and/or the like. In some embodiments, the network 110 includes one or more user entity-controlled computing devices and/or other enterprise devices (e.g., an end-user's or enterprise router, modem, switch, and/or other network access point) and/or one or more external utility devices (e.g., Internet service provider communication towers, cell towers, and/or other devices). In some embodiments, the vehicle onboard systems 102 communicates with one or more of the other connected vehicle systems 104, vehicle operation management systems 106, environment data systems 108 over the network 110 to receive and/or transmit the data described herein for generating the user interfaces for providing to one or more displays of a vehicle 112. In some embodiments, the network 110 embodies a datalink uplink to the vehicle 112 (e.g., via the vehicle onboard systems 102) that communicatively couple the airborne systems to the ground systems.

Figure 2:
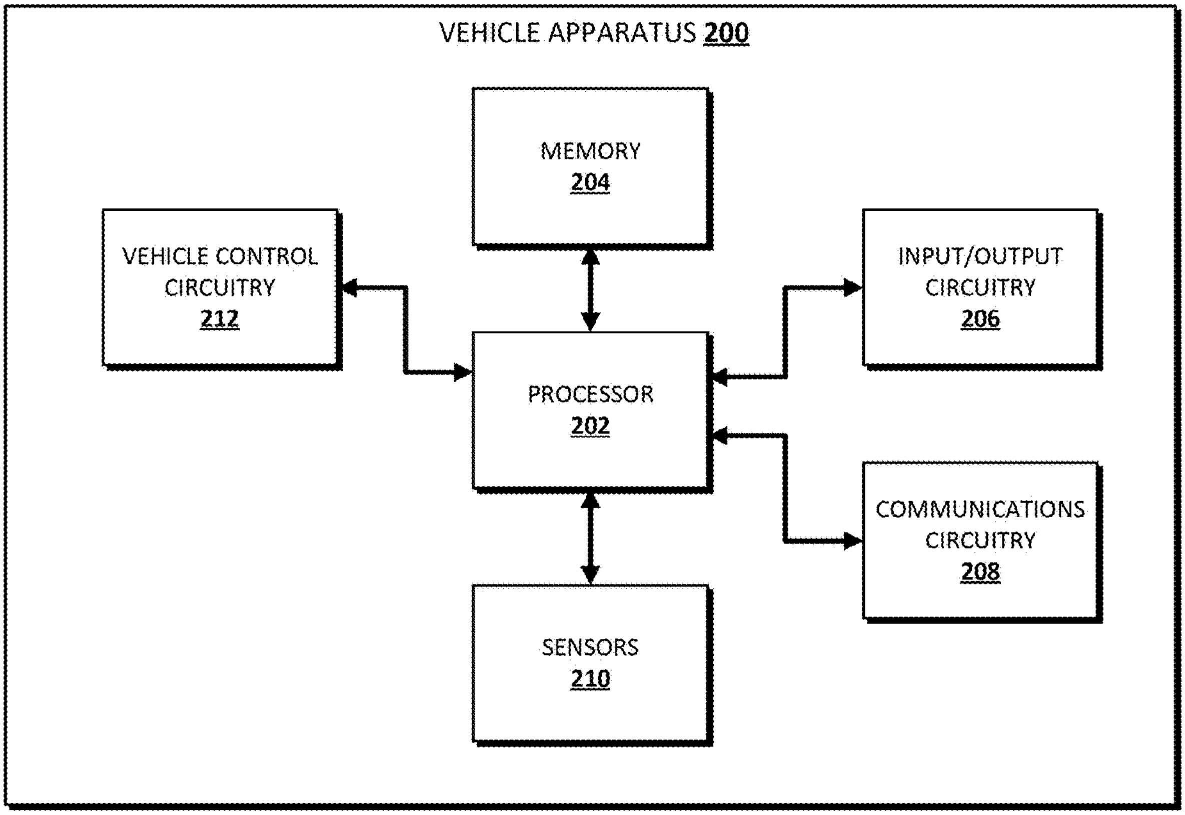
FIG. 2 illustrates an example vehicle apparatus in accordance with at least some example embodiments of the present disclosure.

FIG. 2 illustrates an example vehicle apparatus in accordance with at least some example embodiments of the present disclosure. Specifically, FIG. 2 depicts a vehicle apparatus 200. In some embodiments, one or more computing devices and/or systems of a vehicle (e.g., a vehicle 112), for example included in or embodied by the vehicle onboard systems 102 onboard a vehicle 112, is embodied by one or more computing devices such as the vehicle apparatus 200 as depicted and described in FIG. 2. As depicted, the vehicle apparatus 200 includes a processor 202, memory 204, input/output circuitry 206, communication circuitry 208, sensors 210, and/or vehicle control circuitry 212. In some embodiments, the vehicle apparatus 200 is configured, using one or more of the sets of circuitry embodying processor 202, memory 204, input/output circuitry 206, communication circuitry 208, sensors 210, and/or vehicle control circuitry 212, to execute one or more operations described herein.

Although components are described with respect to functional limitations, it should be understood that the particular implementations necessarily include the use of particular computing hardware. It should also be understood that in some embodiments certain of the components described herein include similar or common hardware. For example, two sets of circuitry may both leverage use of the same processors, network interfaces, storage mediums, and/or the like, to perform their associated functions, such that duplicate hardware is not required for each set of circuitry. The use of the term "circuitry" as used herein with respect to components of the apparatuses described herein should therefore be understood to include particular hardware configured to perform the functions associated with the particular circuitry as described herein.

Particularly, the term "circuitry" should be understood broadly to include hardware and, in some embodiments, software for configuring the hardware. For example, in some embodiments, "circuitry" includes processing circuitry, storage media, network interfaces, input/output devices, and/or the like. Additionally or alternatively, in some embodiments, other elements of the vehicle apparatus 200 provide or supplement the functionality of another particular set of circuitry. For example, the processor 202 in some embodiments provides processing functionality to any of the other sets of circuitry, the memory 204 provides storage functionality to any of other the sets of circuitry, the communication circuitry 208 provides network interface functionality to any of the other sets of circuitry, and/or the like.

In some embodiments, the processor 202 (and/or co-processor or any other processing circuitry assisting or otherwise associated with the processor) is/are in communication with the memory 204 via a bus for passing information among components of the vehicle apparatus 200. In some embodiments, for example, the memory 204 is non-transitory and includes for example, one or more volatile and/or non-volatile memories. In other words, for example, the memory 204 in some embodiments includes or embodies an electronic storage device (e.g., a computer readable storage medium). In some embodiments, the memory 204 is configured to store information, data, content, applications, instructions, or the like, for enabling the vehicle apparatus 200 to carry out various functions in accordance with example embodiments of the present disclosure. Furthermore, in various embodiments, the memory 204 is configured to store one or more portions of data related to a datastore associated with a trip plan management system associated with a vehicle embodying a respective vehicle apparatus 200.

In various embodiments, the processor 202 is embodied in a number of different ways. For example, in some example embodiments, the processor 202 includes one or more processing devices configured to perform independently. Additionally or alternatively, in some embodiments, the processor 202 includes one or more processors configured in tandem via a bus to enable independent execution of instructions, pipelining, and/or multithreading. The use of the terms "processor" and "processing circuitry" should be understood to include a single core processor, a multi-core processor, multiple processors internal to the vehicle apparatus 200, and/or one or more remote or "cloud" processors external to the vehicle apparatus 200.

In an example embodiment, the processor 202 is configured to execute instructions stored in the memory 204 or otherwise accessible to the processor 202. Additionally or alternatively, the processor 202 in some embodiments is configured to execute hard-coded functionality. As such, whether configured by hardware or software methods, or by a combination thereof, the processor 202 represents an entity (e.g., physically embodied in circuitry) capable of performing operations according to an embodiment of the present disclosure while configured accordingly. Additionally or alternatively, as another example in some example embodiments, when the processor 202 is embodied as an executor of software instructions, the instructions specifically configure the processor 202 to perform the algorithms embodied in the specific operations described herein when such instructions are executed.

As one particular example embodiment, the processor 202 is configured to perform various operations associated with executing one or more trip activities associated with a trip plan, for example as described with respect to operating and/or reconfiguring the vehicle onboard systems 102 in FIG. 1 and/or as described further herein. In some embodiments, the processor 202 includes hardware, software, firmware, and/or a combination thereof, that receives and/or generates data including one or more portions of vehicle state data, trip activity data, vehicle performance data, vehicle sensor data, environmental data, and/or logistical data.

Additionally or alternatively, in some embodiments, the processor 202 includes hardware, software, firmware, and/or a combination thereof, that causes rendering of one or more portions of data generated by an onboard trip activity manager and/or rules engine via one or more electronic interfaces associated with the vehicle apparatus 200 and/or one or more electronic interfaces associated with other computing devices related to the trip plan management system (e.g., a trip plan management apparatus and/or one or more entity computing devices). Additionally or alternatively, in some embodiments, the processor 202 includes hardware, software, firmware, and/or a combination thereof, that in real-time updates rendering of a user interface and/or interface elements thereof in response to updated data related to the execution of a respective trip plan by a vehicle 112.

In some embodiments, the vehicle apparatus 200 includes input/output circuitry 206 that provides output to the user and, in some embodiments, to receive an indication of a user input (e.g., user input generated by a pilot, remote operator, crew member, and/or passenger). In some embodiments, the input/output circuitry 206 is in communication with the processor 202 to provide such functionality. The input/output circuitry 206 in some contexts comprises one or more user interfaces and, in some embodiments, includes a display that comprises the interfaces rendered as a web user interface, an application user interface, a user device, a backend system, or the like. In some embodiments, the input/output circuitry 206 also includes a keyboard, a mouse, a joystick, a touch screen, touch areas, soft keys a microphone, a speaker, or other input/output mechanisms.

The processor 202, and/or input/output circuitry 206 comprising a processor, in some embodiments is configured to control one or more functions of one or more user interface elements through computer program instructions (e.g., software and/or firmware) stored on a memory accessible to the processor 202 (e.g., memory 204, and/or the like). In some embodiments, the input/output circuitry 206 includes or utilizes a user-facing application to provide input/output functionality to a computing device and/or other display associated with a user. In some embodiments, the input/output circuitry 206 includes and/or integrates with a primary flight display and/or a multi-function display of an aerial vehicle. Additionally or alternatively, in some embodiments, the input/output circuitry 206 includes one or more software-rendered user interfaces including interface elements that depict particular data and/or information, and/or that receive user input.

The communication circuitry 208 includes any means such as a device or circuitry embodied in either hardware or a combination of hardware and software that is configured to receive and/or transmit data from/to a communications network and/or any other computing device, circuitry, or module in communication with the vehicle apparatus 200. In this regard, the communication circuitry 208 includes, for example in some embodiments, a network interface for enabling communications with a wired or wireless communications network. Additionally or alternatively in some embodiments, the communication circuitry 208 includes one or more network interface cards, antennas, buses, switches, routers, modems, and supporting hardware, firmware, and/or software, or any other device suitable for enabling communications via one or more communications networks. Additionally or alternatively, the communication circuitry 208 includes circuitry for interacting with the antennas and/or other hardware or software to cause transmission of signals via the antennas or to handle receipt of signals received via the antennas. In some embodiments, the communication circuitry 208 enables transmission to and/or receipt of data from one or more computing devices and/or systems of other connected vehicle systems 104, vehicle operation management systems 106, and/or environment data systems 108, in communication with the vehicle apparatus 200.

The sensors 210 include hardware, software, firmware, and/or a combination thereof, that supports generation, capturing, aggregating, retrieval, and/or receiving of one or more portions of vehicle sensor data. In some embodiments, the sensors 210 includes one or more discrete components of a vehicle 112. The sensors 210 in some embodiments are affixed to, within, and/or otherwise as a part of an aerial vehicle including or otherwise associated with the vehicle apparatus 200. For example, in some embodiments, one or more of the sensors 210 is/are mounted to an aerial vehicle, such as a vehicle 112. Non-limiting examples of sensors 210 include altimeters (e.g., radio and/or barometric), pressure sensors, pilot tubes, anemometers, image cameras, video cameras, infrared sensors, speed sensors, battery sensors, fuel level sensors, biological sensors and/or the like. In some embodiments, the sensors 210 are integrated with, or embodied by, one or more of the vehicle onboard systems 102 such that the sensors 210 generate, collect, monitors, and/or otherwise obtain data related to the one or more vehicle onboard systems 102.

In some embodiments, the sensors 210 additionally or alternatively include any of a myriad of sensors conventionally associated with drones, helicopters, and/or other urban air mobility aerial vehicles. Additionally or alternatively, in some embodiments, the sensors 210 include one or more high-sensitivity sensors to facilitate enable high accuracy capturing of data in certain circumstances. For example, in some embodiments, the sensors 210 includes one or more high-sensitivity sensors that capture detailed data while an aerial vehicle is in flight. Such higher fidelity sensors in some contexts supplement and/or, in other embodiments, replace the data captured by such sensors with lower fidelity.

In some embodiments, the sensors 210 includes hardware, software, firmware, and/or a combination thereof, embodying one or more navigation sensors. In some embodiments, the navigation sensors include a global positioning satellite (GPS) tracking chip and/or the like enabling location services to be requested and/or determined for a particular aerial vehicle. Additionally or alternatively, in some embodiments, the sensors 210 includes hardware, software, firmware, and/or any combination thereof, embodying inertial navigation sensors that measures speed, acceleration, orientation, and/or position-related data in a 3D environment. Additionally or alternatively, in some embodiments, the sensors 210 includes one or more cameras associated with a synthetic vision system (SVS). In some such embodiments, such an SVS camera captures image data representations of the real-world environment around an aerial vehicle for use in generating corresponding user interfaces depicting he captured image data, augmenting such image data, and/or otherwise providing data to enable an operator to acquire situational awareness based at least in part on the captured image data. It will be appreciated that, in some embodiments, the sensors 210 includes a separate processor, specially configured field programmable gate array (FPGA), or a specially programmed application specific integrated circuit (ASIC).

The vehicle control circuitry 212 includes hardware, software, firmware, and/or a combination thereof, that supports functionality associated with navigating and/or controlling a vehicle (e.g., a vehicle 112). In some embodiments, vehicle control circuitry 212 may control and/or configure one or more of the vehicle onboard systems 102. In some embodiments, vehicle control circuitry 212 includes hardware, software, firmware, and/or a combination thereof, that receives trip plan data (e.g., trip plan data embodying one or more trip activities, trip activity location data, trip plan waypoint data, flight plan data, etc.), location services data representing a location of a vehicle 112, and/or the like. Additionally or alternatively, in some embodiments, the vehicle control circuitry 212 includes hardware, software, firmware, and/or a combination thereof, that depicts interface elements representing at least a travel path or indication where the vehicle 112 is currently traveling and/or should travel.

Additionally or alternatively, in some embodiments, the vehicle control circuitry 212 includes hardware, software, firmware, and/or a combination thereof, that autonomously controls one or more components of an aerial vehicle. In some such embodiments, the vehicle control circuitry 212 autonomously controls one or more physical components of a vehicle (e.g., a vehicle 112) to facilitate movement of the vehicle along a particular path. Additionally or alternatively, in some embodiments, the vehicle control circuitry 212 includes hardware, software, firmware, and/or a combination thereof, that semi-autonomously controls one or more components of an aerial vehicle, for example where certain aspects of the operation of the aerial vehicle are autonomously performed and others (e.g., directional control) is/are controlled by a user (e.g., a pilot).

Additionally or alternatively, in some embodiments, the vehicle control circuitry 212 includes hardware, software, firmware, and/or a combination thereof, that receives pilot input for controlling one or more components of an aerial vehicle, for example via vehicle flight controls to alter speed and/or direction of the aerial vehicle. Additionally or alternatively, in some embodiments, the vehicle control circuitry 212 includes hardware, software, firmware, and/or a combination thereof, that causes changes to an operational mode (e.g., an alternate, energy-conserving operational mode) of a vehicle, for example autonomously based at least in part on one or more data-driven adverse situations and/or triggers, or in response to user input initiating the change in operational mode. It will be appreciated that, in some embodiments, the vehicle control circuitry 212 includes a separate processor, specially configured field programmable gate array (FPGA), or a specially programmed application specific integrated circuit (ASIC).

It will be appreciated that, further in some embodiments, two or more of the sets of circuitries 202-212 are combinable. Additionally or alternatively, in some embodiments, one or more of the sets of circuitry 202-212 perform some or all of the functionality described associated with another component. For example, in some embodiments, one or more of the sets of circuitry 202-212 are combined into a single component embodied in hardware, software, firmware, and/or a combination thereof. Similarly, in some embodiments, one or more of the sets of circuitry is/are combined with the processor 202, such that the processor 202 performs one or more of the operations described above with respect to each of these other sets of circuitry.

Figure 3:
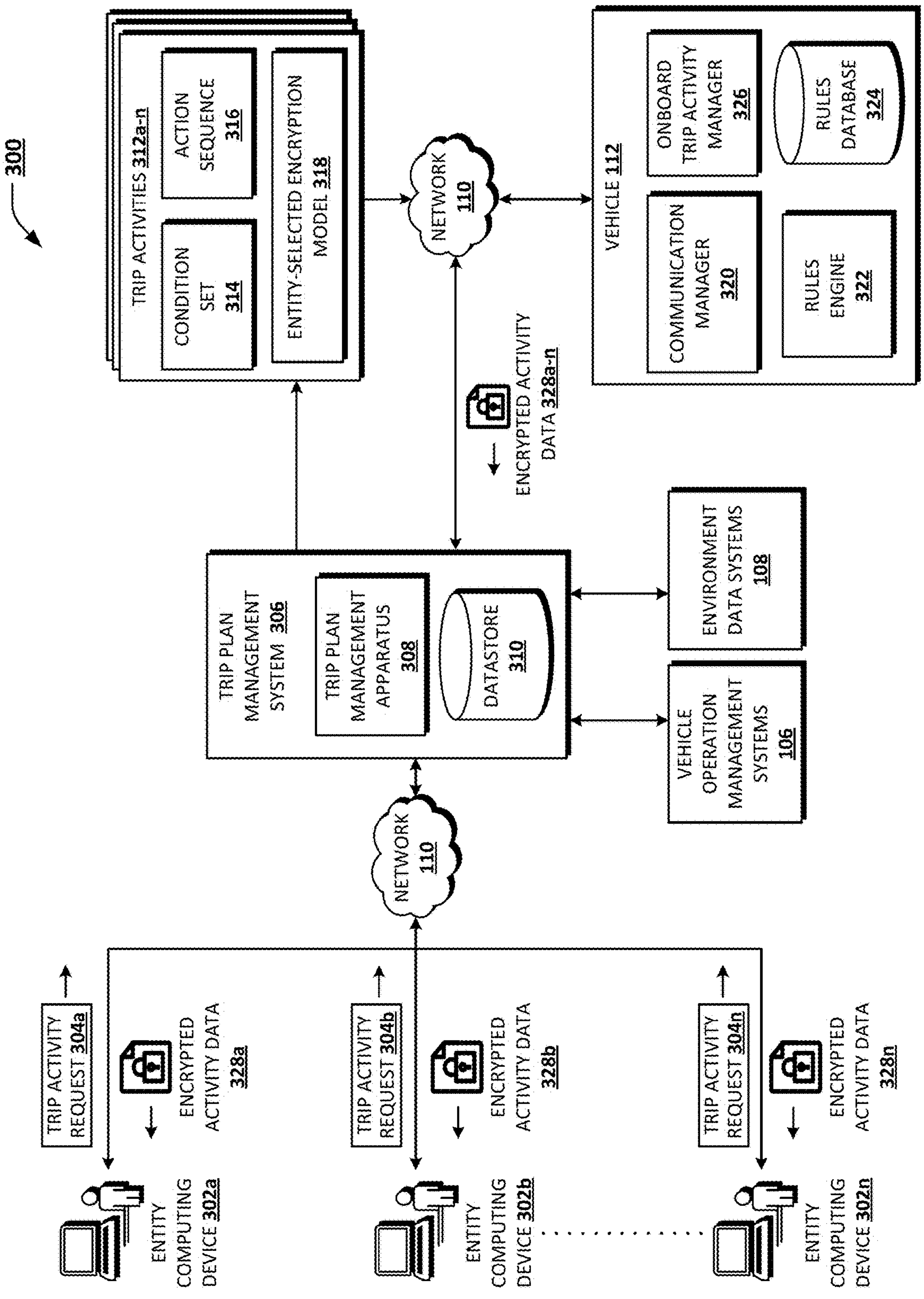
FIG. 3 illustrates an example architecture configured to provide adaptive trip activity and data security management for multiple respective entities in accordance with at least some example embodiments of the present disclosure.

FIG. 3 illustrates an example architecture 300 configured to provide adaptive trip activity and data security management for multiple respective entities in accordance with at least some example embodiments of the present disclosure. As shown, FIG. 3 depicts the various operational services, systems, components, apparatuses, and datastores integrated with, embodied by, and/or otherwise associated with a trip plan management system 306. For example, the architecture 300 includes one or more entity computing devices 302*a-n*, the trip plan management system 306, and/or a vehicle 112. In various embodiments, the trip plan management system 306 comprises a trip plan management apparatus 308 and a datastore 310 and is configured to integrate with and/or communicate with one or more vehicle operation management systems 106 and/or one or more environment data systems 108. In various embodiments, the entity computing devices 302*a-n*, the trip plan management system 306, the vehicle operation management systems 106, the environment data systems 108, and/or the vehicle 112, in some contexts, communicate via the network 110.

As shown in FIG. 3, the vehicle 112 may embody and/or otherwise integrate with a communication manager 320, a rules engine 322, a rules database 324, and/or an onboard trip activity manager 326. In various embodiments, the communication manager 320, the rules engine 322, the rules database 324, and/or the onboard trip activity manager 326, in some contexts, integrates with, or are embodied by, a vehicle apparatus 200 associated with the vehicle 112. Additionally or alternatively, in various contexts, the communication manager 320, the rules engine 322, the rules database 324, and/or the onboard trip activity manager 326 integrates with one or more vehicle onboard systems 102 and/or sensors 210 associated with the vehicle 112.

In various embodiments, the trip plan management system 306 communicates with the onboard trip activity manager 326 via communication manager 320 through the network 110. For example, the trip plan management system 306 may be configured to communicate with the onboard trip activity manager 326 through one or more of the components parts of the trip plan management apparatus 308 (e.g., communication circuitry) and one or more component parts of the vehicle apparatus 200 (e.g., communication circuitry 208) in conjunction with the communication manager 320 via the network 110.

Due to the distributed nature of the various embodiments of the present disclosure, the trip plan management system 306 and the operational systems and/or services associated therewith, in some contexts, are configured to freely pass data via one or more communications networks (e.g., network 110) in order to optimally delegate one or more operations described herein. This delegation of operations provides the technical benefit of optimizing the capabilities of a particular vehicle (e.g., a particular vehicle 112) based at least in part on the processing power associated with the particular vehicle. As will be appreciated, the delegation of certain methods, procedures, calculations, computations, configurations, predictions, and/or the like throughout the distributed operational systems and/or services associated with the trip plan management system 306 reduces the load on the vehicle onboard systems 102 of the vehicle, as well as the load on the computing devices (e.g., the trip plan management apparatus 308, entity computing devices 302*a-n*, etc.) associated with the trip plan management system 306.

The architecture 300 may comprise various data storage systems deployed in various configurations. As defined herein, a database and/or datastore (e.g., datastore 310) in some contexts is any type of non-transitory computer-readable storage medium. Non-limiting examples include hardware, software, firmware, and/or a combination thereof capable of storing, recording, updating, retrieving, deleting, and/or managing computer-readable data and information related to the trip plan management system 306.

Furthermore, in various embodiments, one or more databases may be embodied by a vehicle 112 and/or associated with the onboard trip activity manager 326 such as, for example, the rules database 324 and/or an entity-specific encryption database associated with a particular entity. In some contexts, one or more databases (e.g., the rules database 324 and/or an entity-specific encryption database) embodied by a vehicle 112 may be accessible via a communications network (e.g., the network 110) by one or more components of the various embodiments of the present disclosure (e.g., the trip plan management apparatus 308). In various embodiments, a database and/or datastore (e.g., the datastore 310, the rules database 324, and/or an entity-specific encryption database) in some contexts is a cloud-based storage system accessible via a communications network (e.g., the network 110) by one or more components of the various embodiments of the present disclosure.

The trip plan management system 306 may also be configured to embody and/or integrate with one or more electronic displays. For example, the trip plan management system may integrate with one or more electronic displays associated with the entity computing devices 302*a-n*, the trip plan management apparatus 308, and/or the onboard trip activity manager 326, and may comprise, in various contexts, one or more cockpit displays, one or more vertical situation displays (VSDs), one or more PFDs, one or more displays associated with an FMS, one or more displays associated with a navigation system, one or more displays associated with one or more respective LRUs, one or more computer displays, and/or the like. In various contexts, the one or more electronic displays may be associated with one or more computing devices associated with the trip plan management system 306. In various contexts, the electronic displays may be configured to display a user interface related to an application instance associated with the trip plan management system 306 that is configured to allow one or more entities to initiate one or more commands, operations, requests, instructions, and/or the like related to the various techniques described herein.

As shown in FIG. 3, the trip plan management system 306 is configured to receive (e.g., via the network 110) one or more trip activity requests 304*a-n* generated by one or more respective entity computing devices 302*a-n* associated with one or more respective entities. In some embodiments, the trip plan management system 306 is configured to generate a trip activity 312*a* based on a respective trip activity request 304*a* received by an entity computing device 302*a* associated with a particular entity. In various embodiments, a trip activity request 304*a* may comprise and/or otherwise be associated with one or more portions of data related to a condition set 314, action sequence 316, and/or entity-selected encryption model 318 generated, selected, and/or otherwise indicated by a particular entity.

In some embodiments, a trip activity request 304*a* is generated via a cloud-based user interface and/or application instance generated, rendered, displayed, transmitted, and/or otherwise associated with the trip plan management system 306. In various embodiments, one or more commands, operations, and/or portions of executable program code associated with a trip activity 312*a* and/or trip activity request 304*a* are configured to invoke one or more application programming interface (API) services from the cloud (e.g., one or more services associated with the trip plan management system 306, one or more data encryption services, one or more entity verification services, etc.).

In various embodiments, the trip plan management system 306 employs the trip plan management apparatus 308 to facilitate the generation and/or reception of one or more trip activity requests 304*a-n* from one or more respective entity computing devices 302*a-n*. The trip plan management apparatus 308, in some contexts is a computing apparatus deployed in many configurations, the details of which will be provided in the description of FIG. 4 which illustrates the various components of the trip plan management apparatus 308. In some embodiments, the trip plan management apparatus 308 is configured to generate one or more interactive user interfaces for rendering on one or more electronic displays associated with the one or more respective entity computing devices 302*a-n* and/or the trip plan management system 306. For example, in some embodiments, the trip plan management apparatus 308 is configured to generate interactive user interfaces and/or dashboards comprising various interactive interface elements representing data related to the trip plan management system 306, data related to one or more trip activities 312*a-n*, data related to one or more rules engines, data related to one or more onboard trip activity managers 326, data related to one or more vehicles 112, data related to the one or more systems integrated with the trip plan management system 306, and/or data related to the one or more storage systems associated with the trip plan management system 306. In various examples, the trip plan management apparatus 308 is configured to generate and/or cause generation of the interactive user interfaces and/or dashboards for a trip plan management system application instance associated with respective vehicle 112.

Additionally, the trip plan management apparatus 308, via the one or more interactive user interfaces and/or dashboards, is configured to initialize, configure, update, modify, control and/or otherwise set up an onboard trip activity manager 326 associated with a particular vehicle 112. Additionally or alternatively, the trip plan management apparatus 308, via the one or more interactive user interfaces and/or dashboards, is configured to initialize, configure, update, modify, and/or otherwise set up one or more components associated with the vehicle 112 such as, for example, the communication manager 320, the rules engine 322, the rules database 324, and/or the onboard trip activity manager 326.

The datastore 310 associated with the trip plan management system 306 in some contexts is configured to store, retrieve, configure, modify, and/or otherwise manage one or more portions of data related to the trip plan management system 306. For instance, the datastore 310, in some contexts, stores data related to one or more entities, one or more trip activity requests 304*a-n*, one or more trip activities 312*a-n*, one or more trip plans, one or more vehicles 112, and/or one or more portions of training data for training and/or re-training the rules engine 322. Additionally, the datastore 310 in some contexts stores one or more portions of data associated with the environment data systems 108 and/or the vehicle operation management systems 106. As such, the one or more portions of data comprised in the datastore 310 may be used to train, re-train, and/or otherwise update the rules engine 322. In this way, the rules engine 322 may be iteratively trained such that the accuracy, efficiency, and/or performance of the rules engine 322 are increased over time.

Furthermore, the datastore 310 is configured to store one or more portions of data related to one or more vehicles 112 associated with the trip plan management system 306. For example, the datastore 310 in some contexts stores one or more vehicle profiles, vehicle identifiers, vehicle load identifiers, vehicle component identifiers, onboard trip activity manager identifiers, vehicle fleet data, vehicle mission data, and/or any other data pertinent to the one or more vehicles 112 associated with the trip plan management system 306. Additionally, the datastore 310 may store one or more portions of personnel data related to one or more vehicle operators, vehicle pilots, vehicle crew members, ground crew members, management personnel, and/or passengers associated with the trip plan management system 306.

In various embodiments, the datastore 310 may be configured as cloud-based storage systems. As such, the one or more portions of data comprised in the datastore 310 may be accessed, retrieved, updated, and/or managed by the vehicle apparatus 200 via the network 110. Additionally or alternatively, in various embodiments, the one or more portions of data comprised in the datastore 310 may be accessed, retrieved, updated, and/or managed by the trip plan management apparatus 308 via the network 110. Additionally or alternatively, the one or more portions of data comprised in the datastore 310 may, in various contexts, be stored locally in the vehicle apparatus 200 and/or the trip plan management apparatus 308.

As shown in FIG. 3, the trip plan management system 306 may be configured to generate one or more trip activities 312*a-n* based on one or more trip activity requests 304*a-n*. A trip activity 312*a* may be associated with various types of actions, commands, procedures, and/or operations to be executed by one or more hardware and/or software components of a respective vehicle 112. Non-limiting types of trip activities 312*a-n* comprise an image capture trip activity (e.g., the capture of image data related to buildings and/or critical infrastructure, image data used for terrain mapping, etc.), a video capture trip activity (e.g., the capture of video data for broadcasting events, entertainment, search-and-rescue missions, security, etc.), a sensor data collection trip activity (e.g., the capture of a measurement and/or collection of sensor data (e.g., temperature, humidity, air-quality, etc.)), a parcel delivery trip activity (e.g., the transport and/or delivery of a payload at a particular location), and/or a chemical distribution trip activity (e.g., the spraying of pesticides over a particular geographic region).

In various embodiments, a trip activity 312*a* comprises and/or is otherwise associated with a condition set 314, an action sequence 316, and/or an entity-selected encryption model 318. A condition set 314 is a list of conditions that must be met in order to execute and/or initiate execution of a particular action sequence 316 associated with a respective trip activity 312*a*. For example, a condition set 314 may describe one or more required conditions including, but not limited to, a required location (e.g., a particular global positioning system (GPS) coordinate set), required environmental factors (e.g., a required visibility, temperature, cloud cover, moisture level, and/or other relevant weather factors), a required heading of a respective vehicle 112, a required distance of a vehicle 112 from an object of interest (e.g., a relative distance to an object to be imaged by a camera coupled to the vehicle 112), required safety parameters (e.g., a required separation distance between a vehicle 112 and one or more humans, animals, vehicles, structures, obstacles, etc.), required legal parameters (e.g., UAM standards, federal aviation authority (FAA) guidelines, municipal laws, etc.), and/or the like.

An action sequence 316 is a set of actions, commands, operations, and/or the like to be performed by a respective vehicle 112 and/or one or more components of the respective vehicle 112. For example, an action sequence 316 may be associated with a particular trip activity type (e.g., an image capture trip activity). In some embodiments, an action sequence 316 is associated with an action definition and/or an action postcondition generated by a respective entity. An action definition is associated with one or more commands and/or operations to be performed on behalf of the entity. As a non-limiting example, an action definition may comprise one or more commands and/or operations associated with capturing a set of images of a water tank at the location 33.43600 N, 112.03560 W.

In some embodiments, an action postcondition associated with an action sequence 316 includes one or more commands and/or operations related to a post-processing, quality control, and/or data encryption operation related to one or more portions of trip activity data generated during the execution of an action definition. For example, an action postcondition includes a mechanism to do post-processing and/or data transfer from a vehicle 112 to a respective entity associated with the trip activity 312*a*. In some contexts, post-processing involves determining (e.g., via an onboard trip activity manager 326 and/or vehicle apparatus 200) whether minimal quality criteria associated with the trip activity data has been met. For example, if minimal quality criteria associated with one or more images captured by the vehicle 112 is not met, one or more portions of the action sequence 316 may be re-initiated, and/or re-executed.

In some embodiments, trip activity data encryption is also performed as part of an action postcondition. For example, in some embodiments, a data encryption manager associated with the onboard trip activity manager 326 is configured to encrypt one or more portions of trip activity data generated by the vehicle 112 based on an entity-selected encryption model 318 (e.g., an asymmetric data encryption model) associated with a respective trip activity. For example, one or more portions of trip activity data may be encrypted in order to generate encrypted activity data 328*a-n* based on an encryption key associated with a respective entity. The onboard trip activity manager 326 can, via a communication manager 320, transmit the encrypted activity data 328*a-n* directly to the respective entity (e.g., directly to a client supplied URL accessible via an entity computing device 302*a*). Additionally or alternatively, the onboard trip activity manager 326 can, via the communication manager 320, transmit the encrypted activity data 328*a-n* to a server system (e.g., a datastore 310) to which the entity has exclusive access. This ensures entity control of data security and privacy.

The entity-selected encryption model 318 associated with a respective trip activity 312*a* enables entities to ensure that trip activity data generated during the execution of the respective trip activity 312*a* is encrypted. In various embodiments, an entity is enabled to select, indicate, generate, and/or otherwise configure an entity-selected encryption model 318 from a plurality of available encryption models based on one or more preferences via a user interface and/or application instance associated with the trip plan management system 306. For example, in some embodiments, the trip plan management system 306 may be configured to employ a plurality of encryption models including at least one of a symmetric encryption model (e.g., an advanced encryption standard (AES)-based model, an asymmetric encryption model (e.g., a Rivest-Shamir-Adleman (RSA)-based model), a block cypher encryption model, a stream cipher encryption model, and/or an image encryption model.

For example, in various contexts, an entity may be enabled to generate (e.g., via a user interface and/or application instance associated with the trip plan management system 306) an RSA key pair and securely store a private key of the RSA key pair while associating a public key of the RSA key pair with a respective trip activity 312*a*. As such, a vehicle 112 executing the respective trip activity 312*a* may be enabled to encrypt trip activity data with the public key that only the respective entity can decrypt. Additionally or alternatively, in various embodiments, a combination of encryption models (e.g., a combination of an AES-based model and an RSA-based model) can be employed to enable large amounts of data and/or data comprised of multiple data types to be encrypted by the onboard trip activity manager 326 of a vehicle 112. In various contexts, such a combination of encryption models may be employed by the onboard trip activity manager 326 and/or the trip plan management system 306 in addition to various, standard secure communication channels, such as transport layer security (TLS) and/or HTTPS protocols.

In addition to a condition set 314, action sequence 316, and/or entity-selected encryption model 318, a respective trip activity 312*a* may be associated with one or more trip activity parameters. In various embodiments, the one or more trip activity parameters represent one or more constraints that are used to determine which type of vehicle is required to execute a respective trip activity 312*a*, which hardware and/or software components are required to execute a respective trip activity 312*a*, as well as to facilitate the grouping of trip activities 312*a-n* associated with various entities into a respective trip plan by the trip plan management system 306. For example, in various embodiments, the one or more trip activity parameters include, but are not limited to, a date and time, a geographic region, one or more preferred weather conditions, one or more vehicle hardware requirements, and/or one or more vehicle sensor requirements necessary to execute a respective trip activity 312*a*.

The communication manager 320 associated with a respective vehicle 112 is configured to receive, transmit, store, manage, and/or otherwise process one or more portions of data associated with the respective vehicle 112. For example, the communication manager 320 is configured to receive and/or transmit one or more portions of data related to one or more trip activities 312*a-n* associated with the respective vehicle 112 (e.g., encrypted activity data). The communication manager 320 integrates with, among other components, an onboard trip activity manager 326, one or more vehicle onboard systems 102, a vehicle apparatus 200, and/or one or more circuitries associated with a vehicle 112 to facilitate the safe and secure execution of one or more trip activities 312*a-n* associated with a respective trip plan.

In various embodiments, the communication manager 320 is integrated with the vehicle control circuitry 212 and/or communication circuitry 208 of a vehicle apparatus 200 of a respective vehicle 112. As such, in various contexts, the communication manager 320 is configured to facilitate one or more communications and/or operations of the vehicle 112. Additionally or alternatively, in some embodiments, the communication manager 320 is configured to switch between various communications systems associated with the vehicle 112. For example, the communication manager 320 can determine whether the engage one or more of a satellite communications system, cellular communications system, C-band-based communications system, datalink communications system, and/or the like.

In various contexts, the communication manager 320 may determine to switch from a first communication system to a second communication system based on one or more of a signal strength, channel quality, radio interference, channel-quality indicator (CQI) metric, signal-to-noise ratio (SNR) value, data transmission rate, radio frequency measurement, and/or the like associated with the first and/or second communication system. For example, if the communication manager 320 determines that a signal strength associated with the first communication system (e.g., a cellular communication system) is dropping, failing, and/or not meeting predetermined channel quality standards, the communication manager 320 may switch to the second communication system (e.g., a satellite communications system).

Additionally or alternatively, the communication manager 320 a may switch from a first communication system to a second communication system based on a known communications gap (e.g., a known lack of communications capabilities, reception, etc.) associated with a particular geographical region. For example, if the communication manager 320 determines that a vehicle 112 is to be traversing a geographic region lacking a particular type of communications service (e.g., cellular service), the communication manager 320 may switch to a communications system that will work sufficiently in that geographic region in order to preserve communications between the vehicle 112 and the trip plan management system 306.

Additionally or alternatively, the communication manager 320 may work in conjunction with the onboard trip activity manager 326 to facilitate the execution of one or more trip activities 312*a-n* during a respective trip plan. In addition to the communication manager 320, the onboard trip activity manager 326 associated with a vehicle 112 may also comprise and/or integrate with, among other components, an entity-specific encryption database, a rules engine 322, a rules database 324, one or more vehicle onboard systems 102, a vehicle apparatus 200, and/or one or more sensors 210 configured to facilitate the safe and secure execution of one or more trip activities 312*a-n* associated with a respective trip plan. In this regard, the onboard trip activity manager 326 comprises, embodies, and/or otherwise integrates with one or more of a vehicle state evaluation manager, a command interpreter, a command executor, a data manager, a data encryption manager, and/or one or more vehicle system software development kits (SDKs).

The onboard trip activity manager 326, in some contexts, integrates with, or is embodied by, a computing device such as a line replaceable unit (LRU). For example, the onboard trip activity manager 326 in some contexts is embodied by an aerospace gateway LRU configured to communicate with one or more vehicle systems. In various embodiments, the onboard trip activity manager 326 may integrate with, or is embodied by, a computing device such as a line replaceable unit (LRU) associated with a vehicle, a gateway computing device, a legacy computing device, a flight management system, a takeoff and landing data (TOLD) application, and/or any other combination of computing hardware and/or software associated the vehicle 112.

In this regard, the onboard trip activity manager 326 associated with a respective vehicle may transmit one or more portions of data to one or more computing devices associated with the trip plan management system 306 through a communications network (e.g., via a communication manager 320 associated with the vehicle 112). For example, the onboard trip activity manager 326 in some embodiments is configured to transmit one or more portions of data related to a status of one or more trip activities 312*a-n*, one or more portions of encrypted activity data 328*a-n* associated with the one or more trip activities 312*a-n*, one or more portions of data related to a rules engine 322, one or more portions of data related to a current state of the vehicle 112, and/or one or more portions of data related to operation of the vehicle 112.

In various embodiments, a trip plan management apparatus 308 of the trip plan management system 306 may be configured to execute one or more operations associated with the onboard trip activity manager 326. For example, in various contexts, the trip plan management apparatus 308 may be configured to perform at least a portion of the processing associated with the onboard trip activity manager 326 associated with a vehicle 112 (e.g., an unmanned aerial vehicle). As such, the computational resources needed by the vehicle 112 may be advantageously reduced. Furthermore, in some embodiments, the functionality of the trip plan management system 306 is instead provided via the onboard trip activity manager 326 for a particular vehicle 112 (e.g., via an application instance associated with the trip plan management system 306).

Additionally, in various embodiments, the onboard trip activity manager 326 associated with the vehicle 112 may be configured to work in conjunction with the rules engine 322 in order to execute one or more trip activities 312*a-n*. In various embodiments, the rules engine 322 is configured to receive, evaluate, enforce, trigger, and/or incorporate one or more rules stored in a rules database 324 that were generated by the trip plan management system 306 based on one or more respective trip plan activities 312*a-n* associated with a particular trip plan. The rules engine 322 in some contexts comprises one or more ML models, rule expression models, artificial neural networks (ANNs), recurrent neural networks (RNNs), convolutional neural networks (CNNs), and/or the like.

In various embodiments, the rules engine 322 is configured to receive one or more portions of data related to a current vehicle state related to a respective vehicle 112 to determine whether one or more rule conditions associated with one or more rules comprised in a rules database 324 associated with the vehicle 112 have been satisfied. In response to determining that one or more rule conditions have been satisfied, the rules engine 322 is configured to trigger (e.g., cause execution of) one or more actions of an action sequence 316 associated with a respective trip plan activity 312*a*. In various embodiments, a rule condition associated with a rule corresponds to one or more respective conditions comprised in a condition set 314 of a respective trip activity 312*a*.

A rule is an electronically managed data object and/or portion of executable program code generated based on a respective trip activity 312*a*. In various embodiments, a rule is generated by a rule generator associated with a trip plan management system 306 and is associated with one or more conditions of a condition set 314 of a corresponding trip plan activity 312*a*. A rules engine 322 may trigger an action (e.g., a portion of executable program code configured to cause operation of one or more systems of a vehicle 112) associated with an action sequence 316 of a corresponding trip plan activity 312*a* based on a determination that a corresponding rule condition has been satisfied. In various embodiments, the determination that the corresponding rule condition has been satisfied is based on an evaluation of a current vehicle state associated with the vehicle 112. Upon determining, based on the current vehicle state, that a rule condition has been satisfied, the rules engine 322 may cause an onboard trip activity manager 326 to initiate and/or cause execution of one or more commands, operations, instructions, and/or actions associated with the corresponding trip plan activity 312*a*.

In various embodiments, a rule condition associated with a rule (e.g., and therefore a condition comprised in a condition set 314 associated with a respective trip activity 312*a*) represents an operational constraint, limit, parameter threshold, guideline, and/or the like that, in some contexts, is defined to govern one or more operations, systems, components, and/or environments associated with a particular vehicle 112. Based in part on one or more rules associated with the particular vehicle 112, the rules engine 322, in conjunction with a vehicle state evaluation manager of the onboard trip activity manager 326, can determine whether one or more rule conditions have been violated or satisfied by one or more vehicle systems and/or an environment associated with the vehicle 112.

In various embodiments, a rule condition defines a threshold data value and/or data range which in some contexts is used to determine whether a particular rule has been violated, satisfied, exceeded, and/or otherwise triggered. As a non-limiting example, a rule may define a threshold (e.g., a particular data value and/or data range) related to a relative distance of a vehicle 112 to a respective trip plan waypoint, activity location, and/or object of interest. If the rules engine 322 determines that the vehicle is within the threshold related to a relative distance of the vehicle 112 to a respective trip plan waypoint, activity location, and/or object of interest (and therefore has satisfied the corresponding condition), the rules engine 322 can cause execution of one or more corresponding actions associated with a particular trip plan activity 312*a* associated with the rule. For example, the rules engine 322 may be configured to generate and/or transmit a rule action command to a command interpreter of the onboard trip activity manager 326 which causes execution of one or more actions associated with an action sequence 316 corresponding to a particular trip plan activity 312*a*.

Figure 4:
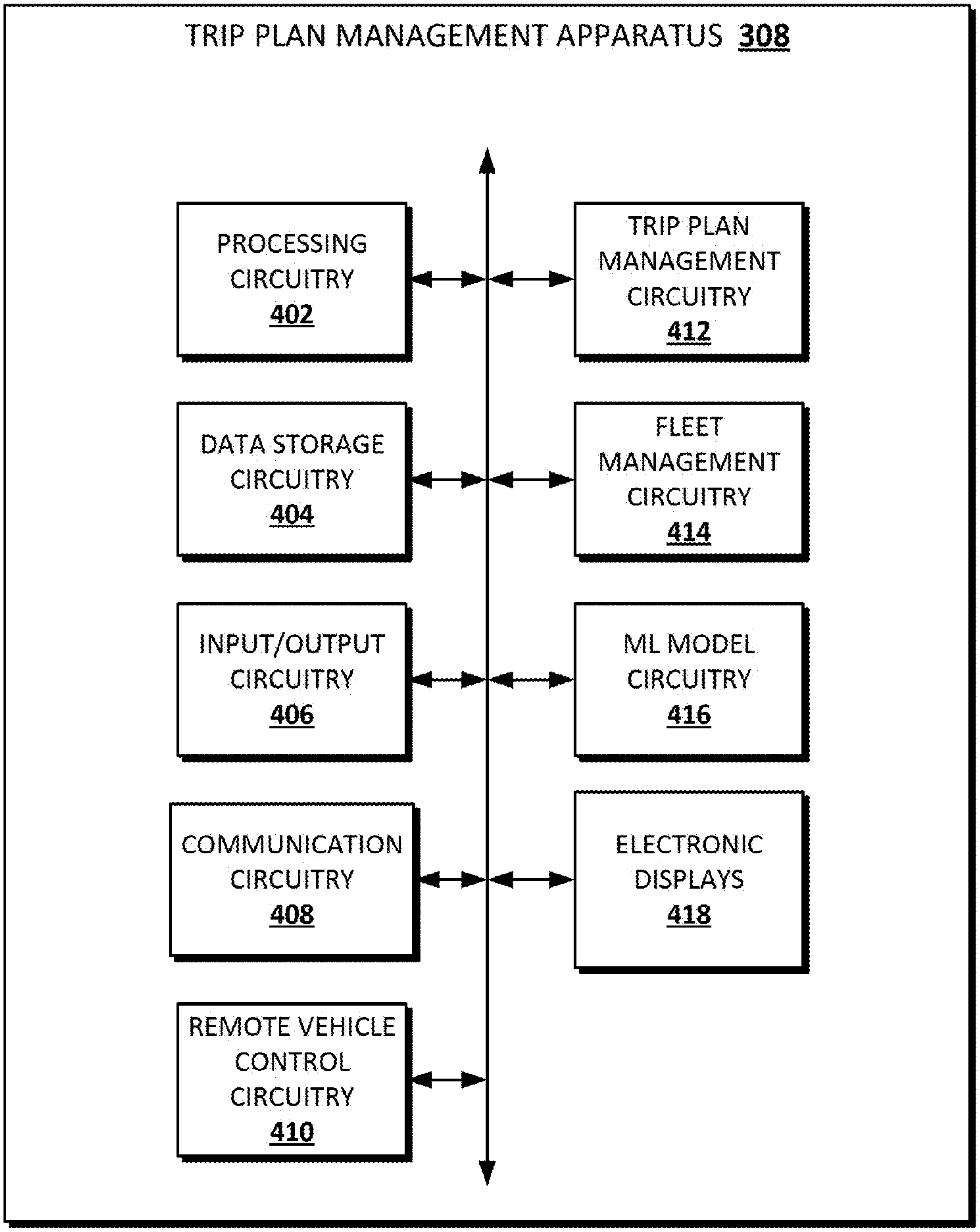
FIG. 4 illustrates an example trip plan management apparatus in accordance with at least some example embodiments of the present disclosure.

FIG. 4 illustrates an example trip plan management apparatus 308 associated with the trip plan management system 306 in accordance with at least some example embodiments of the present disclosure. As depicted in FIG. 4, the trip plan management apparatus 308 comprises processing circuitry 402, data storage circuitry 404, input/output circuitry 406, communication circuitry 408, remote vehicle control circuitry 410, mission management circuitry 412, fleet management circuitry 414, ML model circuitry 416, and/or one or more electronic displays 418. In some embodiments, other elements of the trip plan management apparatus 308 provide or supplement the functionality of another particular set of circuitry. For example, the processing circuitry 402 in some embodiments provides processing functionality to any of the other sets of circuitry, the data storage circuitry 404 provides storage functionality to any of other the sets of circuitry, the communication circuitry 408 provides network interface functionality to any of the other sets of circuitry, and/or the like. Additionally or alternatively, in various embodiments, the trip plan management apparatus 308 is configured to control, configure, and/or otherwise operate one or more of the circuitries 202-212 of the vehicle apparatus 200 illustrated in FIG. 2 via the network 110. Additionally or alternatively, the trip plan management apparatus 308 is configured to control, configure, and/or otherwise operate the one or more vehicle onboard systems 102 associated with a vehicle (e.g., the vehicle 112), as well as the other connected vehicle systems 104.

In some embodiments, the processing circuitry 402 (and/or co-processor or any other processing circuitry assisting or otherwise associated with the processor) is/are in communication with the data storage circuitry 404 via a bus for passing information among components of the trip plan management apparatus 308. In some embodiments, for example, the data storage circuitry 404 is non-transitory and includes for example, one or more volatile and/or non-volatile memories. In other words, for example, the data storage circuitry 404 in some embodiments includes or embodies an electronic storage device (e.g., a computer readable storage medium). In some embodiments, the data storage circuitry 404 is configured to store information, data, content, applications, instructions, or the like, for enabling the trip plan management apparatus 308 to carry out various functions in accordance with example embodiments of the present disclosure. In various embodiments, the data storage circuitry 404 is configured to access, retrieve, store, delete, and/or otherwise manage one or more portions of data in the datastore 310, the rules database 324, and/or an entity-specific encryption database associated a respective vehicle 112.

In various embodiments, the processing circuitry 402 is embodied in a number of different ways. For example, in some example embodiments, the processing circuitry 402 includes one or more processing devices configured to perform independently. Additionally or alternatively, in some embodiments, the processing circuitry 402 includes one or more processors configured in tandem via a bus to enable independent execution of instructions, pipelining, and/or multithreading. The use of the terms "processor" and "processing circuitry" should be understood to include a single core processor, a multi-core processor, multiple processors internal to the trip plan management apparatus 308, and/or one or more remote or "cloud" processors external to the trip plan management apparatus 308.

In an example embodiment, the processing circuitry 402 is configured to execute instructions stored in the data storage circuitry 404 or otherwise accessible to the processing circuitry 402. Additionally or alternatively, the processing circuitry 402 in some embodiments is configured to execute hard-coded functionality. As such, whether configured by hardware or software methods, or by a combination thereof, the processing circuitry 402 represents an entity (e.g., physically embodied in circuitry) capable of performing operations according to an embodiment of the present disclosure while configured accordingly. Additionally or alternatively, as another example in some example embodiments, when the processing circuitry 402 is embodied as an executor of software instructions, the instructions specifically configure the processing circuitry 402 to perform the algorithms embodied in the specific operations described herein when such instructions are executed.

As one particular example embodiment, the processing circuitry 402 is configured to perform various operations associated with facilitating various adaptive trip activity and data security management operations for multiple respective entities by a vehicle 112 during execution of a respective trip plan. In some embodiments, the processing circuitry 402 includes hardware, software, firmware, and/or a combination thereof, that may be configured to receive, retrieve, aggregate, parse, and/or otherwise process data related to one or more trip activity requests 304*a*-*n* generated by one or more entity computing devices 302*a*-*n* associated with one or more respective entities. For example, the processing circuitry 402 may be configured to facilitate the generation of one or more trip activities 312*a*-*n* based on one or more of a condition set 314 and/or action sequence 316 associated with the one or more trip activity requests 304*a*-*n*.

Furthermore, the processing circuitry 402 may be configured to facilitate the selection and/or employment of a respective data encryption model (e.g., an entity-selected encryption model 318) for a respective trip activity 312*a* associated with a particular entity. Additionally or alternatively, in some embodiments, the processing circuitry 402 includes hardware, software, firmware, and/or a combination thereof, that may be configured to receive, retrieve, aggregate, parse, transmit, and/or otherwise process one or more portions of encrypted activity data 328*a*-*n* generated by a vehicle 112 as a result of successfully executing one or more trip activities 312*a*-*n* associated with a respective trip plan.

Additionally or alternatively, in some embodiments, the processing circuitry 402 includes hardware, software, firmware, and/or a combination thereof, that may be configured to generate a trip plan based on a plurality of trip activities 312*a*-*n*, wherein generating the trip plan comprises determining, based on a plurality of trip activity parameters associated with each respective trip activity of the plurality of trip activities 312*a*-*n*, that at least a first trip activity 312*a* and a second trip activity 312*b* can be feasibly executed during the trip plan. Additionally or alternatively, in some embodiments, the processing circuitry 402 includes hardware, software, firmware, and/or a combination thereof, that may be configured to generate at least a first rule set based on the plurality of trip activities 312*a*-*n*, wherein the first rule set is generated based on at least one of the condition set 314 or the action sequence 316 associated with at least one trip activity 312*a* of the plurality of trip activities 312*a*-*n*. Additionally or alternatively, in some embodiments, the processing circuitry 402 includes hardware, software, firmware, and/or a combination thereof, that may be configured to cause a vehicle 112 to execute the trip plan based on the first rule set by inputting the trip plan and the first rule set into the vehicle 112.

Additionally or alternatively, in some embodiments, the processing circuitry 402 includes hardware, software, firmware, and/or a combination thereof, that in real-time updates rendering of one or more user interfaces and/or interface elements thereof associated with the trip plan management system 306 via one or more respective entity computing devices 302*a-n*. In various embodiments, the one or more user interfaces and/or interface elements thereof may be configured to facilitate the interaction of a respective entity with the trip plan management system.

In some embodiments, trip plan management apparatus 308 includes data storage circuitry 404 that is configured to store, update, retrieve, delete, and/or otherwise manage one or more portions of data associated with the datastore 310, rules database 324, and/or onboard one or more entity-specific encryptions databases. As described herein, the data storage circuitry 404, in some contexts, stores and/or retrieves one or more computer program instructions associated with the one or more operations described herein. In various embodiments, the data storage circuitry 404 embodies, or integrates with, a server system, a cloud storage system, a collection of databases, one or more datastores, and/or any other type of non-transitory storage medium. In certain embodiments, the data storage circuitry 404 stores one or more portions of data obtained from the vehicle operation management systems 106 and/or the environment data systems 108. Additionally, in some embodiments, the data storage circuitry 404 is configured to store, update, retrieve, delete, and/or otherwise maintain any training data associated with the various machine learning models associated with the trip plan management system 306 and/or rules engines associated with one or more respective vehicles 112.

In some embodiments, trip plan management apparatus 308 includes input/output circuitry 406 that provides output to the user and, in some embodiments, to receive an indication of a user input (e.g., user input generated by a remote operator, ground crew member, and/or the like). In some embodiments, the input/output circuitry 406 is in communication with the processing circuitry 402 to provide such functionality. The input/output circuitry 406 comprises one or more user interfaces and in some embodiments includes an electronic display that comprises the interfaces rendered as a web user interface, an application user interface, a user device, a backend system, or the like. In some embodiments, the input/output circuitry 406 also includes a keyboard, a mouse, a joystick, a touch screen, touch areas, soft keys a microphone, a speaker, or other input/output mechanisms.

The processing circuitry 402, and/or input/output circuitry 406 comprising a processor, in some embodiments is configured to control one or more functions of one or more interface elements through computer program instructions (e.g., software and/or firmware) stored on a memory accessible to the processing circuitry 402 (e.g., data storage circuitry 404, and/or the like). In some embodiments, the input/output circuitry 406 includes or utilizes a user-facing application to provide input/output functionality to a computing device and/or other display associated with a user. In some embodiments, the input/output circuitry 406 includes a primary flight display and/or a multi-function display associated with a vehicle 112. Additionally or alternatively, in some embodiments, the input/output circuitry 406 includes one or more software-rendered user interfaces including interface elements that depict particular data and/or information, and/or that receive user input. Additionally or alternatively, in some embodiments, the input/output circuitry 406 embodies, integrates with, and/or is otherwise associated with one or more electronic displays 418.

The communication circuitry 408 includes any means such as a device or circuitry embodied in either hardware or a combination of hardware and software that is configured to receive and/or transmit data from/to a communications network and/or any other computing device, circuitry, or module in communication with the trip plan management apparatus 308. In this regard, the communication circuitry 408 includes, for example in some embodiments, a network interface for enabling communications with a wired or wireless communications network. Additionally or alternatively in some embodiments, the communication circuitry 408 includes one or more network interface cards, antennas, buses, switches, routers, modems, and supporting hardware, firmware, and/or software, or any other device suitable for enabling communications via one or more communications networks (e.g., the network 110). Additionally or alternatively, the communication circuitry 408 includes circuitry for interacting with the antennas and/or other hardware or software to cause transmission of signals via the antennas or to handle receipt of signals received via the antennas. In some embodiments, the communication circuitry 408 enables transmission to and/or receipt of data from one or more computing devices and/or systems of other connected vehicle systems 104, vehicle operation management systems 106, and/or environment data systems 108, in communication with the trip plan management apparatus 308.

The remote vehicle control circuitry 410 includes hardware, software, firmware, and/or a combination thereof, that supports functionality associated with navigating and/or controlling a vehicle 112 remotely from the trip plan management system 306. In some embodiments, remote vehicle control circuitry 410 controls and/or configures one or more of the vehicle onboard systems 102 associated with the vehicle. In some embodiments, remote vehicle control circuitry 410 includes hardware, software, firmware, and/or a combination thereof, that receives trip plan data (e.g., trip plan data embodying one or more trip activities, trip activity location data, trip plan waypoint data, flight plan data, etc.), location services data representing a location of the vehicle, and/or the like. Additionally or alternatively, in some embodiments, the remote vehicle control circuitry 410 includes hardware, software, firmware, and/or a combination thereof, that depicts interface elements representing at least a travel path or indication where the vehicle is currently travelling and/or should travel.

Additionally or alternatively, in some embodiments, the remote vehicle control circuitry 410 includes hardware, software, firmware, and/or a combination thereof, that autonomously controls one or more components of a vehicle 112. In some such embodiments, the remote vehicle control circuitry 410 autonomously controls one or more physical components of the vehicle to facilitate movement of the vehicle along a particular path. Additionally or alternatively, in some embodiments, the remote vehicle control circuitry 410 includes hardware, software, firmware, and/or a combination thereof, that semi-autonomously controls one or more components of a vehicle 112, for example where certain aspects of the operation of the vehicle are autonomously performed and others (e.g., directional control) is/are controlled by a user (e.g., a remote operator). Additionally or alternatively, in some embodiments, the remote vehicle control circuitry 410 includes hardware, software, firmware, and/or a combination thereof, that receives remote operator input for controlling one or more components of a vehicle, for example via vehicle flight controls to alter speed and/or direction of the vehicle. It will be appreciated that, in some embodiments, the remote vehicle control circuitry 410 includes a separate processor, specially configured field programmable gate array (FPGA), or a specially programmed application specific integrated circuit (ASIC).

The mission management circuitry 412 includes hardware, software, firmware, and/or a combination thereof, that supports functionality associated with generating, receiving, configuring, and/or otherwise managing data related to the mission of one or more vehicles associated with the trip plan management system 306. For example, the mission management circuitry 412 is configured to generate and/or manage one or more vehicle operation constraints associated with the operation of a vehicle. Vehicle operation constraints include, but are not limited to, constraints related to the configuration of one or more vehicle systems associated with the vehicle, constraints related to a trip plan (e.g., destinations, trip activity locations, waypoints, flight paths, arrival/departure schedules and/or procedures, traffic management constraints, trip parameters, and/or the like), power consumption constraints (e.g., battery and/or fuel consumption thresholds), specific vehicle constraints (e.g., performance capabilities associated with one or more vehicle systems of the vehicle 112), environmental constraints (e.g., regulations related to operating a vehicle 112 in an urban environment), and/or the like. In various embodiments, the one or more vehicle operation constraints in some contexts are rendered via a respective electronic interface associated with the vehicle apparatus 200 and/or the trip plan management apparatus 308.

Additionally, the mission management circuitry 412 includes hardware, software, firmware, and/or a combination thereof, that supports functionality associated with handling one or more logistical aspects of one or more vehicles 112 associated with the trip plan management system 306. Non-limiting examples include monitoring the logistical aspects of one or more destinations (e.g., one or more travel hubs, airports, vertiports, etc.) associated with a trip plan of a vehicle 112. For example, the mission management circuitry 412 in some contexts monitors occupancy (e.g., available facilities to accommodate a vehicle 112) associated with a destination. Additionally or alternatively, the mission management circuitry 412 in some contexts determines logistical aspects related to potential destinations such as nearby health and safety services.

The fleet management circuitry 414 includes hardware, software, firmware, and/or a combination thereof, that supports functionality associated with the management of a fleet of vehicles (e.g., vehicles 112) associated with an enterprise related to the trip plan management system 306. In various embodiments, the fleet management circuitry 414 includes hardware, software, firmware, and/or a combination thereof, that monitors the location, operational status, health, performance, and/or capabilities of one or more vehicles associated with the trip plan management system 306.

The ML model circuitry 416 includes hardware, software, firmware, and/or a combination thereof, that supports functionality associated with the various machine learning models associated with the trip plan management system 306 and/or rules engines associated with one or more respective vehicles 112. For example, the ML model circuitry 416 may be configured to execute, at least in part, one or more portions of program code associated with the methods and operations of a rules engine 322. For example, the ML model circuitry 416 includes hardware, software, firmware, and/or a combination thereof, that may be configured to generate one or more rules associated with one or more trip activities 312*a-n* based on the respective condition sets 314, action sequences 316, and/or entity-selected encryption models 318 associated with the one or more trip activities 312*a-n*. In this regard, the ML model circuitry 416 may be configured to generate one or more rules and/or rule sets to be uploaded along with a respective trip plan into a particular vehicle 112.

Additionally, in various embodiments, the ML model circuitry 416 includes hardware, software, firmware, and/or a combination thereof, that in some contexts is employed to train, retrain, update, and/or otherwise manage a rules engine 322 associated with a respective vehicle 112. In various embodiments, the ML model circuitry 416 is configured to facilitate the training, retraining, updating, and/or management of one or more respective rules engines 322 based in part on a predefined schedule such as, for example, daily, weekly, bi-weekly, monthly, and/or the like. In this regard, the ML model circuitry 416 includes hardware, software, firmware, and/or a combination thereof, that causes the storage, updating, retrieval, and/or the deletion of one or more portions of data associated with the one or more respective rules engines 322.

The electronic displays 418 associated with the trip plan management apparatus 308 may comprise, in various contexts, one or more displays associated with a cockpit of a vehicle (e.g., a vehicle 112), one or more vertical situation displays (VSDs), one or more PFDs, one or more displays associated with an FMS, one or more displays associated with a navigation system, one or more displays associated with one or more respective LRUs, one or more computer displays, and/or the like. The electronic displays 418 are configured to display one or more portions of data related to one or more of trip activity request data, trip activity data, trip plan data, encryption model data, rules engine data, vehicle performance data, vehicle sensor data, vehicle operation data, vehicle system data, air traffic data, environmental data, logistical data, personnel data, and/or any other relevant data related to a particular vehicle 112. In various contexts, the one or more electronic displays 418 may be associated with one or more computing devices and/or data storage systems associated with the trip plan management system 306.

It will be appreciated that, further in some embodiments, two or more of the sets of circuitries 402-418 are combinable. Additionally or alternatively, in some embodiments, one or more of the sets of circuitry 402-418 perform some or all of the functionality described associated with another component. For example, in some embodiments, one or more of the sets of circuitry 402-418 are combined into a single component embodied in hardware, software, firmware, and/or a combination thereof. For example, in some embodiments, two or more of the remote vehicle control circuitry 410 and ML model circuitry 416 are embodied by a single set of circuitry that performs the combined operations of the individual sets of circuitry. Similarly, in some embodiments, one or more of the sets of circuitry, for example remote vehicle control circuitry 410 and/or ML model circuitry 416 is/are combined with the processing circuitry 402, such that the processing circuitry 402 performs one or more of the operations described herein with respect to each of these other sets of circuitry.

Figure 5:
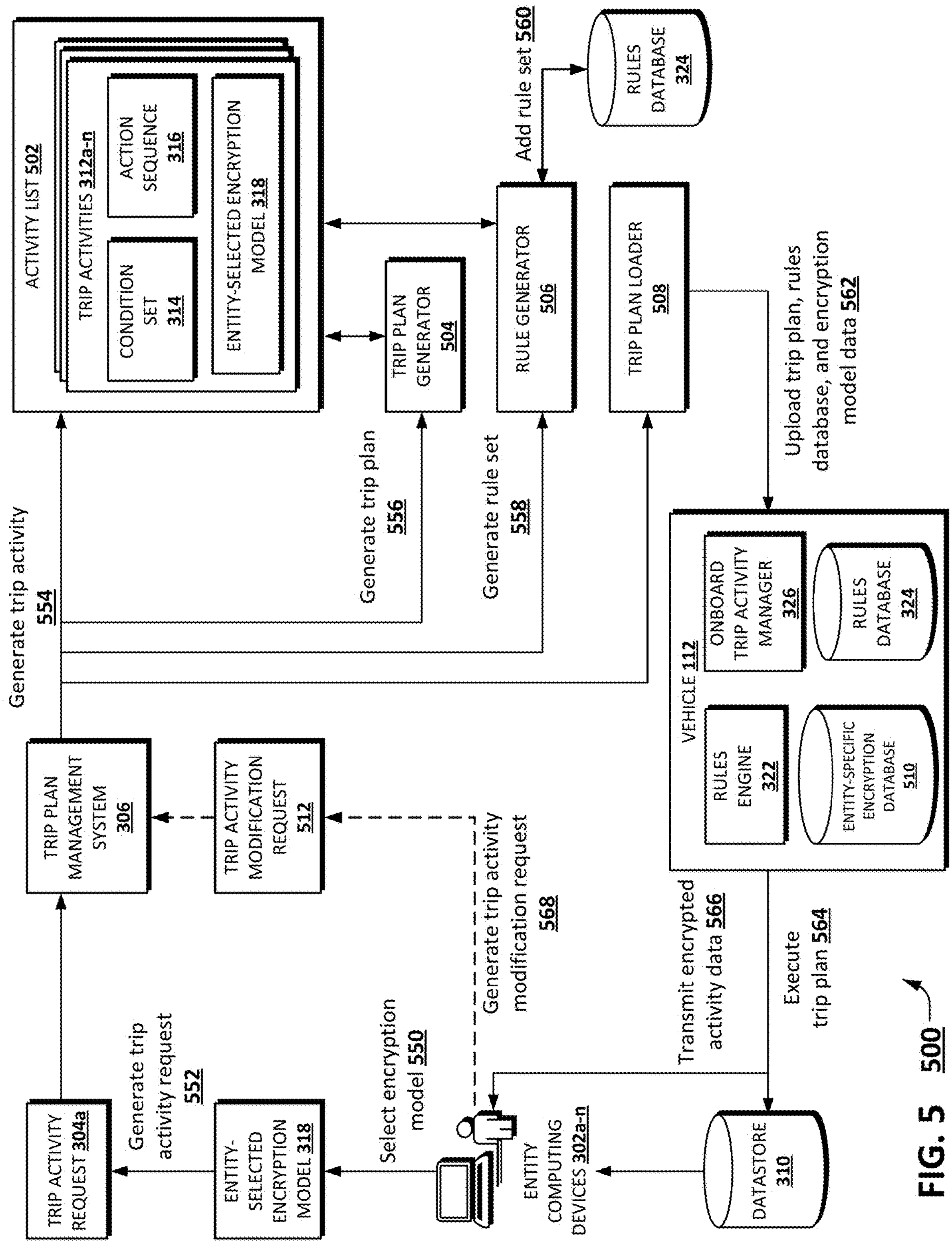
FIG. 5 illustrates an example process flow diagram for generating a trip plan and corresponding rule set to be executed by a vehicle in accordance with at least some example embodiments of the present disclosure.

FIG. 5 illustrates an example process flow diagram 500 for generating a trip plan and corresponding rule set to be executed by a vehicle 112 in accordance with at least some example embodiments of the present disclosure. Specifically, FIG. 5 illustrates various operations, systems, computing devices, and/or computing components configured to generate a trip plan and corresponding rule set to be executed by a vehicle 112. For example, the example process flow diagram 500 depicts one or more entity computing devices 302*a-n* and a trip plan management system 306 configured to generate and/or cause the uploading of a trip plan, a corresponding rules database 324, and/or encryption model data associated with one or more respective entities into a vehicle 112. In various embodiments, the trip plan management system 306 embodies, integrates with, and/or is otherwise associated with a trip plan generator 504, a rule generator 506, and/or a trip plan loader 508. In various embodiments, the trip plan generator 504, the rule generator 506, and/or the trip plan loader 508 are comprised of hardware, software, firmware, and/or a combination thereof that is configured to execute one or more of the operations described herein.

As shown in FIG. 5, at operation 550, an entity associated with a respective entity computing device 302*a*, may be enabled (e.g., via a user interface and/or application instance associated with the trip plan management system 306) to select, indicate, generate, and/or otherwise configure an entity-selected encryption model 318 from a plurality of available encryption models based on one or more preferences. For example, in some embodiments, the trip plan management system 306 may be configured to employ a plurality of encryption models including at least one of a symmetric encryption model (e.g., an AES-based model, an asymmetric encryption model (e.g., RSA-based model), a block cypher encryption model, a stream cipher encryption model, an image encryption model, and/or a combination thereof. In this regard, in various contexts, an entity may be enabled to generate (e.g., via the user interface and/or application instance associated with the trip plan management system 306) an RSA key pair. The entity may be enabled to securely store a private key of the RSA key pair in the respective entity computing device 302*a* while associating a public key of the RSA key pair with a corresponding trip activity request 304*a* to be associated with respective trip activity 312*a*.

At operation 552, the entity associated with the respective entity computing device 302*a*, may be enabled (e.g., via the user interface and/or application instance associated with the trip plan management system 306) to generate a trip activity request 304*a* based in part on the entity-selected encryption model 318. For example, the entity may be enabled to define, select, generate, and/or otherwise indicate via the trip activity request 304*a* one or more of an action definition and/or action postcondition to be associated with an action sequence 316, and/or one or more conditions to be associated with a condition set 314 to be used for executing said action sequence 316. The respective entity computing device 302*a*, may be enabled (e.g., via the user interface and/or application instance associated with the trip plan management system 306) to submit, upload, and/or otherwise transmit the trip activity request 304*a* to the trip plan management system 306.

At operation 554, the trip plan management system 306 may be configured to receive the trip activity request 304*a* and generate a respective trip activity 312*a* based on the trip activity request 304*a*. Additionally, the trip plan management system 306 may be configured to transmit an acknowledgement associated with the generation of the trip activity 312*a* to the respective entity for storage on the entity computing device 302*a*. The trip plan management system 306 may also be configured to add the trip activity 312*a* to an activity list 502 comprising a plurality of trip activities 312*a-n* associated with various respective entities.

At operation 556, the trip plan management system 306 may be configured to, in conjunction with the trip plan generator 504, generate a trip plan associated with one or more trip activities 312*a-n*. In various embodiments, the trip plan generator 504 may employ several techniques to generate a trip plan. For example, in some embodiments, a trip plan is automatically generated using various machine learning models and/or deterministic models (e.g., a genetic algorithm). In some embodiments, a trip plan is generated based on a hybrid approach (e.g., a supervised approach, supervised model, etc.). In various other embodiments, a trip plan is manually generated via one or more interactions with a user interface and/or application instance associated with the trip plan management system 306.

In various contexts, a trip plan is generated based on one or more of a condition set 314, an action sequence 316, an entity-selected encryption model1 318, and/or one or more trip activity parameters associated with the one or more trip activities 312*a-n* comprised in the activity list 502. For example, the trip plan management system 306 may generate, via the trip plan generator 504, a particular trip plan comprising a plurality of trip activities 312*a-n*, where the plurality of trip activities 312*a-n* are selected based on the one or more trip activity parameters associated with each trip activity of the plurality of trip activities 312*a-n*. In various embodiments, the one or more trip activity parameters include, but are not limited to, a date and time, a geographic region, one or more preferred weather conditions, one or more vehicle hardware requirements, and/or one or more vehicle sensor requirements necessary to execute the respective trip activities 312*a-n*.

As such, in some embodiments, a trip plan is generated based on several factors such as the required date and time of the one or more respective trip activities 312*a-n* to be executed, the geographic region where the one or more respective trip activities 312*a-n* are to take place, the geographic proximities for which the one or more respective trip activities 312*a-n* are to be performed, the current weather conditions the geographic region, and/or the trip activity parameters imposed by the one or more respective trip activities 312*a-n* to be performed (e.g., the necessary vehicle systems required, a required camera resolution for capturing image data, the various sensors equipped on the respective vehicle 112, etc.). In some embodiments, a trip plan comprises one or more trip plan waypoints, and/or one or more activity locations that make up the general travel path of the trip plan that a vehicle 112 will follow while executing one or more trip activities 312*a-n*. In various contexts, one or more trip activities 312*a-n* may be associated with a particular trip plan waypoint, or a particular activity location associated with the trip plan.

In various contexts, the trip plan management system 306 may be configured to assign a particular trip plan to a respective vehicle 112 of a plurality of available vehicles based in part on a vehicle profile associated with the vehicle 112. In various embodiments, the vehicle profile is related to the identification of a vehicle and/or one or more parameters, devices, hardware components, and/or capacities associated with the vehicle. A vehicle profile may include one or more portions of data associated with at least one of a vehicle type, a vehicle identifier, a passenger capacity, a total vehicle weight, a vehicle payload capacity, a vehicle fuel capacity, a vehicle fuel type, a vehicle battery system, and/or any descriptive data related to the vehicle 112 such as the status of the vehicle 112, the available systems of the vehicle 112, the available hardware components and/or devices of the vehicle 112, one or more personnel associated with the vehicle 112, and/or any relevant data related to the various capabilities of the vehicle 112.

In this regard, the trip plan management system 306 may be configured to generate a plurality of trip plans based on the various trip activities 312*a-n* comprised in an activity list 502 and assign each of the respective trip plans of the plurality of trip plans to a respective vehicle 112. For example, the trip plan management system 306 may be configured to cause a first vehicle 112 to execute a first trip plan based on a first rule set by inputting the first trip plan and a corresponding first rule set into the first vehicle 112, where the first trip plan and the first rule set are generated based on determining that a first subset of trip activities of the plurality of trip activities 312*a-n* can be feasibly executed during the first trip plan. Additionally, the trip plan management system 306 may be configured to cause a second vehicle 112 to execute a second trip plan based on a second rule set by inputting the second trip plan and the second rule set into the second vehicle 112, where the second trip plan and the second rule set are generated based on determining that a second subset of trip activities of the plurality of trip activities 312*a-n* can be feasibly executed during the second trip plan.

At operation 558, the trip plan management system 306 may be configured to, in conjunction with the rule generator 506, generate a rule set comprising one or more rules associated with the one or more trip activities 312*a-n* associated with a respective trip plan. In various embodiments, the one or more rules comprised in a rule set are generated by the rule generator 506 and are associated with one or more conditions of a condition set 314 of a corresponding trip plan activity 312*a*. As such, the rule set may comprise a plurality of rules associated with one or more trip activities 312*a-n* associated with various respective entities.

As shown by operation 560, in various embodiments, the rule generator 506 may be configured to transmit and/or cause storage of a particular rule set in a rules database 324. As described herein, a rules engine 322 associated with a vehicle 112 may trigger, based on the rule set comprised in the rules database 324, an action (e.g., a portion of executable program code configured to cause operation of one or more systems of the vehicle 112) associated with an action sequence 316 of a corresponding trip plan activity 312*a* based on a determination that a corresponding rule condition associated with the rule set has been satisfied. In various embodiments, the determination that the corresponding rule condition has been satisfied is based on an evaluation of a current vehicle state associated with the vehicle 112.

At operation 562, the trip plan management system 306 may be configured to, in conjunction with the trip plan loader 508, upload the trip plan, the rules database 324, and/or various encryption model data related to various entities (e.g., data related to various entity-selected encryption models 318) associated with the trip plan to the vehicle 112. As shown in FIG. 5, in various embodiments, a vehicle 112 may comprise an entity-specific encryption database 510. The entity-specific encryption database 510 may be configured to securely store various data related to one or more entity-selected encryption models 318 (e.g., encryption key information), encrypted activity data 528*a-n*, and/or the like for one or more entities associated with the trip plan. Additionally or alternatively, in some embodiments, the entity-specific encryption database 510 may be partitioned such that any activity data generated, collected, and/or encrypted by the vehicle based on executing a respective trip activity 312*a* for a respective entity is stored separately from any data associated with any other entities.

At operation 564, the vehicle 112 may be configured to execute the trip plan and, accordingly, execute the one or more trip plan activities 312*a-n* associated with trip plan. In some embodiments, a data encryption manager associated with the onboard trip activity manager 326 of the vehicle 112 is configured to encrypt one or more portions of trip activity data generated during execution of the trip plan based on an entity-selected encryption model 318 (e.g., an asymmetric data encryption model) associated with a respective trip activity 312*a*. For example, one or more portions of trip activity data may be encrypted in order to generate encrypted activity data 328*a-n* based on an encryption key associated with a respective entity.

At operation 566, the vehicle 112, by way of an associated onboard trip activity manager 326 can, in conjunction with a communication manager 320, transmit the encrypted activity data 328*a-n* directly to the respective entity (e.g., directly to a client supplied URL accessible via an entity computing device 302*a*). Additionally or alternatively, the onboard trip activity manager 326 can, via the communication manager 320, transmit the encrypted activity data 328*a-n* to a server system (e.g., a datastore 310) to which the entity has exclusive access.

At optional operation 568, the entity associated with the respective entity computing device 302*a*, may be enabled (e.g., via the user interface and/or application instance associated with the trip plan management system 306) to generate a trip activity modification request 512. For example, in various contexts, the trip plan management system 306 may be configured to receive, during execution of the trip plan, a trip activity modification request 512 associated with an entity, where the trip activity modification request 512 is associated with one or more updates to a respective trip activity 312*a*. In response to receiving the trip activity modification request 512, the trip plan management system 306 may be configured to determine whether the trip activity modification request 512 adversely impacts the trip plan currently being executed by the vehicle 112.

If the trip plan management system 306 determines that the trip activity modification request 512 does not adversely impact the execution of the trip plan by the vehicle 122, the trip plan management system 306 may be configured to generate, via the rule generator 506, a second rule set based on the trip activity modification request 512. In some embodiments, the second rule set may be generated based on at least one of a modified condition set or a modified action sequence associated with the trip activity modification request 512. In some contexts, the modified condition set is generated based on one or more updates to the one or more conditions associated with the condition set 314 of a respective trip activity 312*a*. Similarly, in some contexts, the modified action sequence is generated based on one or more updates to the action sequence 316 of the respective trip activity 312*a*. The trip plan management system 306 may be configured to upload, via the trip plan loader 508, the second rule set to the vehicle 112. In this manner, the trip plan management system 306 may be configured to cause, based on the second rule set, the vehicle 112 to update the execution of the trip plan to execute the trip activity modification request during the execution of the trip plan.

Figure 6:
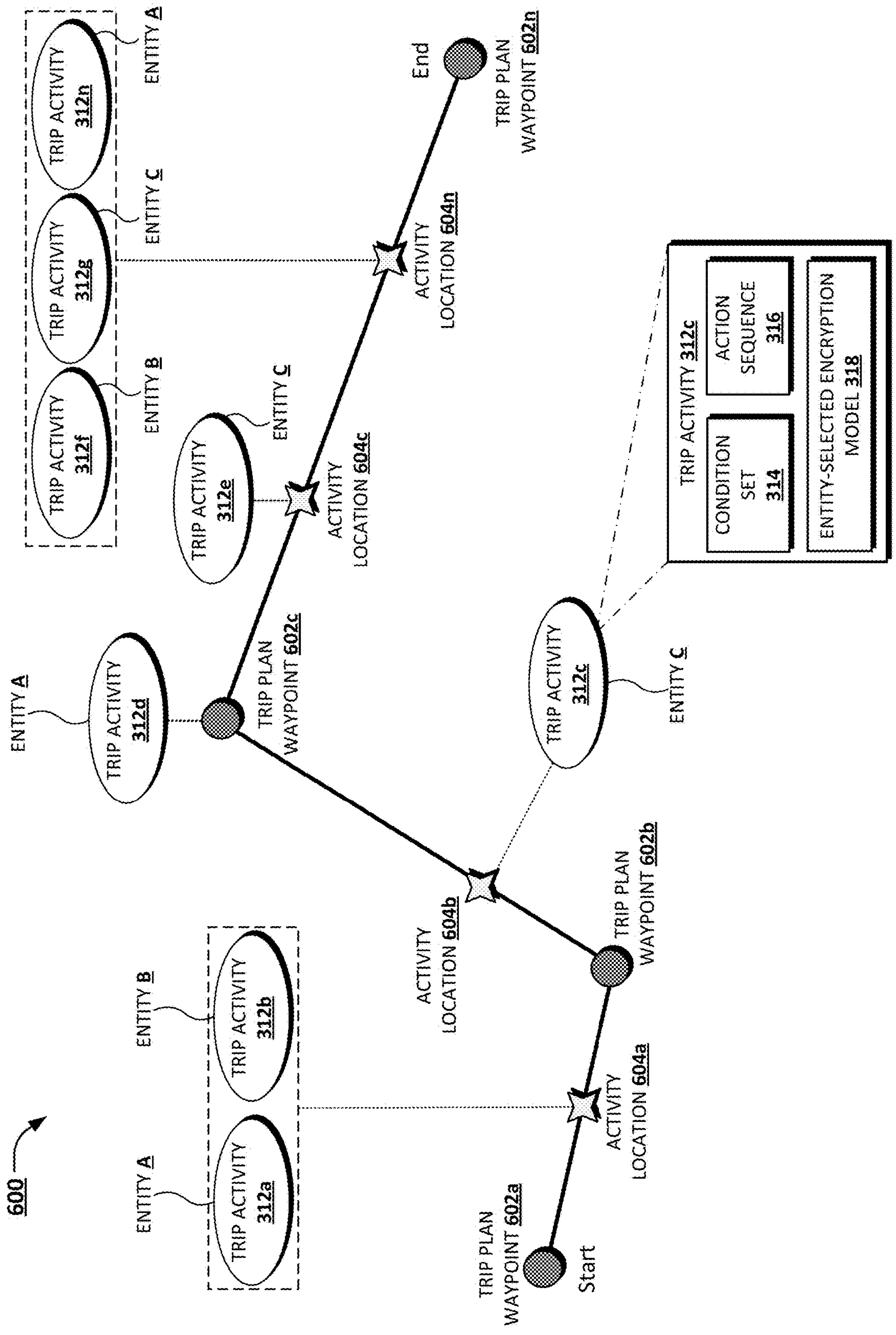
FIG. 6 illustrates an example trip plan associated with various trip activities to be executed for multiple respective entities in accordance with at least some example embodiments of the present disclosure.

FIG. 6 illustrates an example trip plan 600 associated with various trip activities 312*a-n* to be executed for multiple respective entities in accordance with at least some example embodiments of the present disclosure. In some embodiments, a trip plan 600 may comprise one or more trip plan waypoints 602*a-n*, and/or one or more activity locations 604*a-n* that make up the general travel path of the trip plan that a vehicle 112 will follow while executing one or more trip activities 312*a-n*. In various contexts, one or more trip activities 312*a-n* may be associated with a particular trip plan waypoint 602*a* or a particular activity location 604*a* associated with the trip plan 600.

As shown in FIG. 6, a respective trip plan waypoint of the one or more trip plan waypoints 602*a-n* and/or a respective activity location of the one or more activity locations 604*a-n* may be associated with one or more trip plan activities 312*a-n* related to various entities. For example, the activity location 604*b* is associated with a single trip activity 312*c*, where trip activity 312*c* is associated with Entity C. As another example, the activity location 604*a* is associated with trip activity 312*a* and trip activity 312*b*, where trip activity 312*a* is associated with Entity A, and trip activity 312*b* is associated with Entity B. As yet another example, the activity location 604*n* is associated with trip activity 312*f*, trip activity 312*g*, and trip activity 312*n*, where trip activity 312*f* is associated with Entity B, trip activity 312*g* is associated with Entity C, and trip activity 312*n* is associated with Entity A. Similarly, in various embodiments, a trip plan waypoint may be associated with one or more trip activities 312*a-n*. For example, as shown in FIG. 6, trip plan waypoint 602*c* is associated with trip activity 312*d*, where trip activity 312*d* is associated with Entity A.

In various embodiments, the one or more trip plan waypoints 602*a-n* and/or the one or more activity locations 604*a-n* may be associated with one or more navigational coordinates (e.g., GPS coordinates) configured to guide the navigation of the vehicle 112 during execution of the trip plan. Furthermore, the one or more trip plan waypoints 602*a-n* and/or the one or more activity locations 604*a-n* may be associated with one or more objects of interest. For example, the one or more objects of interest may include, but are not limited to, one or more structures (e.g. homes, buildings, etc.), utilities infrastructure (e.g., pipelines, water tanks, electrical grid components, telecommunications equipment, etc.), transportation infrastructure (e.g., bridges, roads, interchanges, etc.), environmental features (e.g., volcanoes, mountains, farmland, crops, etc.), specific geographic regions (e.g., particular plots of land, districts, subdivisions, etc.), and/or the like. Additionally or alternatively, the one or more activity locations 604*a-n* may comprise one or more mobile objects of interest for which a vehicle 112 is meant to track, follow, and/or otherwise observe based on one or more trip activities 312*a-n*. For example, the one or more mobile objects of interest may include, but are not limited to, one or more vehicles (e.g., farm equipment, cars, trucks, aerial vehicles, etc.), one or more persons (e.g., individuals competing in a sporting event), one or more animals (e.g., livestock, electronically tagged animals, wild animals, etc.), and/or the like.

Figure 7:
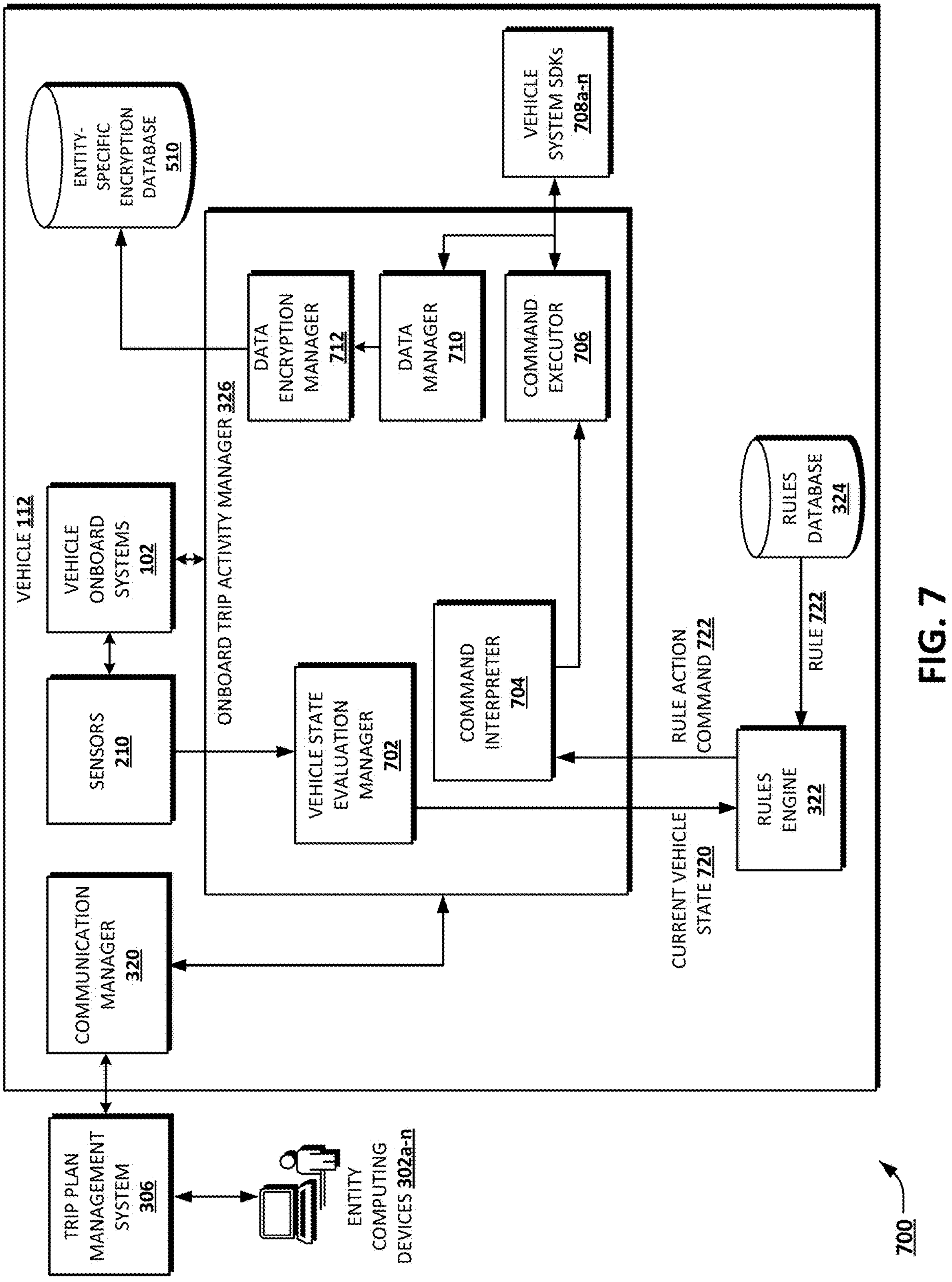
FIG. 7 illustrates an example process flow diagram for executing a trip plan by a vehicle in accordance with at least some example embodiments of the present disclosure.

FIG. 7 illustrates an example process flow diagram 700 for executing a trip plan by a vehicle 112 in accordance with at least some example embodiments of the present disclosure. Specifically, FIG. 7 illustrates how the onboard trip activity manager 326 integrates with various systems and components of a vehicle 112 to execute one or more trip activities 312*a-n* associated with a respective trip plan. In various embodiments, the onboard trip activity manager 326 comprises, embodies, and/or otherwise integrates with one or more of a vehicle state evaluation manager 702, a command interpreter 704, a command executor 706, one or more vehicle system software development kits (SDKs) 708*a-n*, a data manager 710, and/or a data encryption manager 712. In various embodiments, the vehicle state evaluation manager 702, the command interpreter 704, the command executor 706, the one or more vehicle system software development kits (SDKs) 708*a-n*, the data manager 710, and/or the data encryption manager 712 are comprised of hardware, software, firmware, and/or a combination thereof that is configured to execute one or more of the operations described herein.

In various embodiments, the vehicle state evaluation manager 702 may be configured to receive one or more portions of vehicle operation data and/or vehicle sensor data generated by one or more vehicle onboard systems 102 and/or sensors 210 associated with the vehicle 112. Based at least in part on the one or more portions of vehicle operation data and/or vehicle sensor data, the vehicle state evaluation manager 702 may be configured to generate a current vehicle state 720 associated with the vehicle 112. In various contexts, the current vehicle state 720 is configured to describe the current status, operational parameters, data values, operational modes, and/or configurations of one or more vehicle systems (e.g., vehicle onboard systems 102) associated with the vehicle 112.

In various embodiments, the vehicle state evaluation manager 702 may be configured to transmit the current vehicle state 720 associated with the vehicle 112 to the rules engine 322 based on a predetermined periodicity of time t. For example, the vehicle state evaluation manager 702 may be configured to transmit the current vehicle state 720 associated with the vehicle 112 to the rules engine 322 every t milliseconds, seconds, minutes, hours, and/or the like, where the value for t is preconfigured by the trip plan management system 306 and used to configure the onboard trip activity manager 326. In some embodiments, the onboard trip activity manager 326 will cause the vehicle state evaluation manager 702 to transmit the current vehicle state 720 to the rules engine 322 based on the predetermined periodicity of time t until the onboard trip activity manager 326 determines that each rule comprised in the rules database 324 has been evaluated.

In various embodiments, the rules engine 322 is configured to receive one or more portions of data related to a current vehicle state 720 related to the vehicle 112 to determine whether one or more rule conditions associated with one or more rules comprised in a rules database 324 associated with the vehicle 112 have been satisfied. In response to determining that one or more rule conditions have been satisfied, the rules engine 322 is configured to trigger (e.g., cause execution of) one or more actions of an action sequence 316 associated with a respective trip plan activity 312*a*. In various embodiments, a rule condition associated with a rule corresponds to one or more respective conditions comprised in a condition set 314 of the respective trip activity 312*a*.

Upon determining, based on the current vehicle state 720, that a rule condition has been satisfied, the rules engine 322 may cause a trip plan activity manager 326 to initiate and/or cause execution of one or more commands, operations, instructions, and/or actions associated with the corresponding trip plan activity 312*a*. For example, in some embodiments, the rules engine 322 is configured to generate a rule action command 722 associated with the rule corresponding trip plan activity 312*a* that has been satisfied. The rules engine 322 may be configured to transmit the rule action command 722 to a command interpreter 704 of the onboard trip activity manager 326.

In various embodiments, the command interpreter may be configured to receive, parse, and/or otherwise process data related to a rule action command 722 generated by the rules engine 322. For example, in various contexts, the command interpreter 704 may determine, based on the rule action command 722, that the vehicle 112 is meant to begin capturing image data of an object of interest located in a current location of the vehicle (e.g., an activity location 604*a*). As such, the command interpreter 704 may direct the command executor 706 to cause execution of one or more actions (e.g., imaging actions) associated with the action sequence 316 corresponding to a particular trip plan activity 312*a*.

In some embodiments, the command executor 706 is configured to cause the execution of one or more actions associated with a particular action sequence 316 of a respective trip activity 312*a*. As such, the command executor 706 may be configured to integrate with, manage, direct, and/or otherwise control one or more vehicle devices, vehicle systems, and/or vehicle components in order to successfully execute the actions comprised in an action sequence 316. In this regard, the command executor may be configured to interface with one or more vehicle system SDKs 708*a-n* associated with the one or more vehicle devices, vehicle systems, and/or vehicle components associated with the vehicle 112.

In one or more embodiments, the vehicle system SDKs 708*a-n* may be comprised of one or more portions of executable program code configured to control, operate, and/or configure one or more hardware and/or software components, devices, and/or systems associated with the vehicle 112. Non-limiting examples of vehicle system SDKs 708*a-n* include, but are not limited to, SDKs associated with one or more camera and gimbal systems, vehicle sensor systems, parcel delivery systems, chemical sprayer systems, robotics systems, computer vision systems, vehicle onboard systems 102, and/or the like.

In various embodiments, the data manager 710 may be configured to receive, retrieve, collect, and/or otherwise compile one or more portions of trip activity data generated during the execution of one or more trip activities 312*a-n* initiated by the command executor 706 in conjunction with the vehicle system SDKs 708*a-n*. Once a respective trip activity 312*a* has been successfully completed, the data manager 710 may be configured to transmit the associated trip activity data to the data encryption manager 712 for entity-specific data encryption. The data encryption manager 712 may be configured to use various parameters associated with an entity-selected encryption model 318 associated with a respective trip activity 312*a* to encrypt the trip activity data.

In some embodiments, trip activity data encryption is performed as part of an action postcondition associated with an action sequence 316. For example, in some embodiments, the data encryption manager 712 is configured to encrypt one or more portions of trip activity data received from the data manager 710 based on an entity-selected encryption model 318 (e.g., an asymmetric data encryption model) associated with a respective trip activity 312*a*. For example, one or more portions of trip activity data may be encrypted in order to generate encrypted activity data 328*a* based on an encryption key associated with a respective entity. In various contexts, the data encryption manager 712 may be configured to store the encrypted activity data 328*a* in the entity-specific encryption database 510 and/or transmit the encrypted activity data 328*a* to an entity computing device 302*a* (e.g., via the communication manager 320) upon successful encryption.

Example Processes of the Disclosure

Having described example systems, apparatuses, data flows, user interfaces, and user interface elements in accordance with the present disclosure, example processes of the disclosure will now be discussed. It will be appreciated that each of the flowcharts depicts an example computer-implemented process that is performable by various means, including one or more of the apparatuses, systems, devices, and/or computer program products described herein, for example utilizing one or more of the specially configured components thereof.

It will be understood that each block of the processes, and combinations of blocks in the flowcharts, may be implemented by various means including hardware and/or a computer program product comprising one or more computer-readable mediums having computer-readable program instructions stored thereon. For example, one or more of the processes described herein in some embodiments is/are embodied by computer program of a computer program product. In this regard, the computer program products that embody the processes described herein in some embodiments comprise one or more non-transitory memory devices of a computing device, apparatus, and/or the like (for example, the memory 204 of the vehicle apparatus 200) storing instructions executable by a processor of a computing device (for example, by the processor 202 of the vehicle apparatus 200). In some embodiments, the computer program instructions of the computer program product that embody the processes are stored by non-transitory computer-readable storage mediums of a plurality of computing devices. It will be appreciated that any such computer program products may be loaded onto one or more computers and/or other programmable apparatuses (for example, a vehicle apparatus 200), such that the computer program product including the program code instructions that execute on the computers or other programmable apparatuses create means for implementing the functions specified in the operational blocks.

Further, in some embodiments, the computer program product includes one or more non-transitory computer-readable memories on which the computer program instructions are stored such that the one or more computer-readable memories may direct one or more computers and/or other programmable apparatuses to function in a particular manner, such that the computer program product comprises an article of manufacture that implements the functions specified in the operational blocks. Additionally or alternatively, in some embodiments, the computer program instructions of one or more computer program products are loaded onto computing devices or other programmable apparatuses to cause a series of operations to be performed on the computing devices or other programmable apparatuses a computer-implemented process such that the instructions that execute on the computing devices or other programmable apparatuses implement the functions specified in the operational blocks.

Each of the processes depicted includes a plurality of operational blocks defining a particular algorithm for performing one or more portions of functionality for generating and/or outputting improved user interfaces as described herein. The blocks indicate operations of each process. Such operations may be performed in any of a number of ways, including, without limitation, in the order and manner as depicted and described herein. In some embodiments, one or more blocks of any of the processes described herein occur in-between one or more blocks of another process, before one or more blocks of another process, in parallel with one or more blocks of another process, and/or as a sub-process of a second process. Additionally or alternatively, any of the processes in various embodiments include some or all operational steps described and/or depicted, including one or more optional blocks in some embodiments. With regard to the flowcharts illustrated herein, one or more of the depicted blocks in some embodiments is/are optional in some, or all, embodiments of the disclosure. Optional blocks are depicted with broken (or "dashed") lines. Similarly, it should be appreciated that one or more of the operations of each flowchart may be combinable, replaceable, and/or otherwise altered as described herein.

Figure 8:
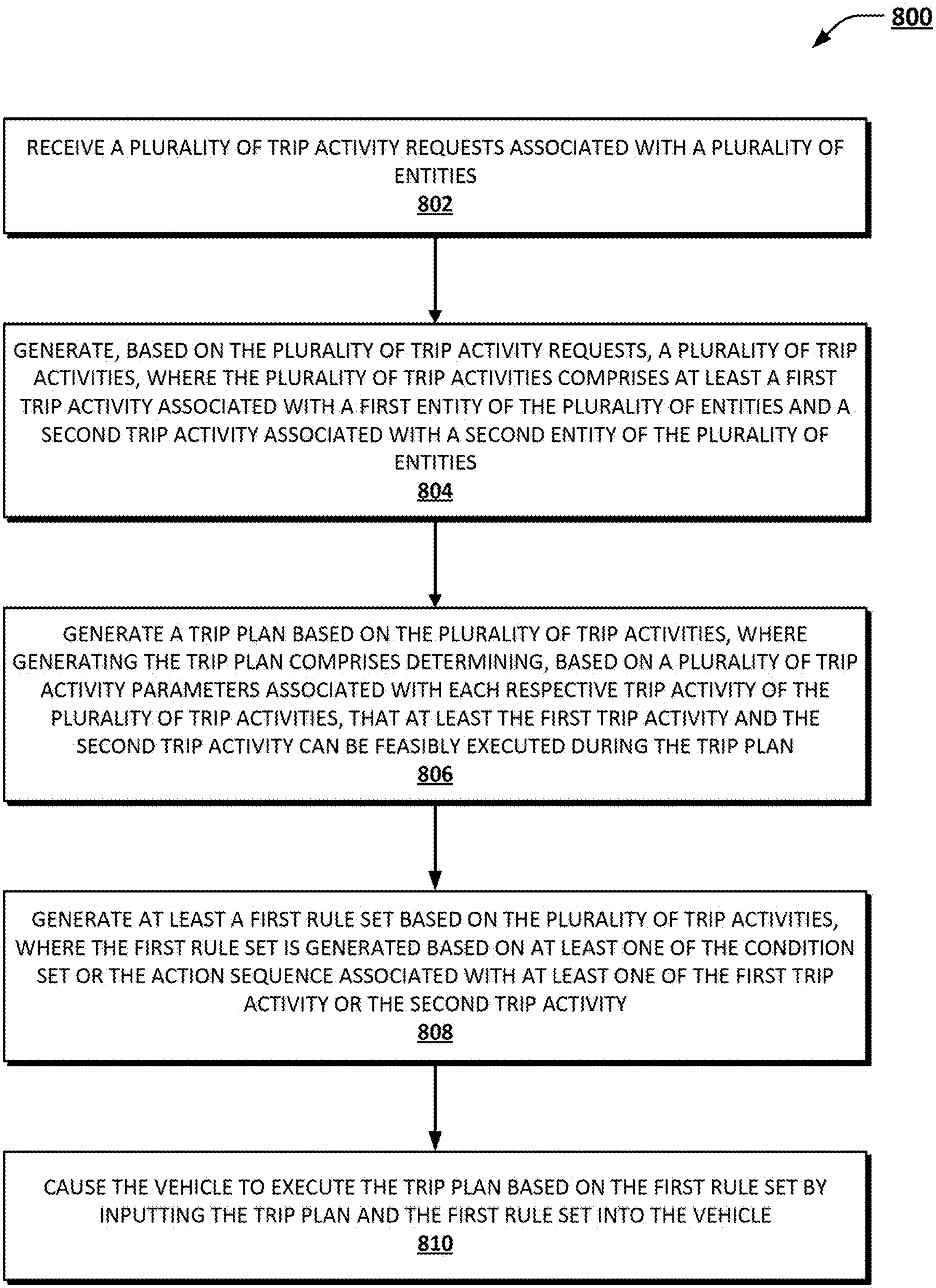
FIG. 8 illustrates a flowchart depicting example operations of an example process for providing adaptive trip activity and data security management for multiple respective entities in accordance with at least some example embodiments of the present disclosure.

FIG. 8 illustrates a flowchart depicting example operations of an example process for providing adaptive trip activity and data security management for multiple respective entities in accordance with at least some example embodiments of the present disclosure. In some embodiments, the process 800 is embodied by a computer-implemented process executable by any of a myriad of computing devices, apparatuses, systems, and/or the like as described herein. Additionally or alternatively, in some embodiments, the process 800 is embodied by computer program code stored on a non-transitory computer-readable storage medium of a computer program product configured for execution to perform the process as depicted and described.

Additionally or alternatively, in some embodiments, the process 800 is performed by one or more specially configured computing devices, such as the trip plan management apparatus 308 alone or in communication with one or more other components, devices, systems, and/or the like (e.g., such as the vehicle apparatus 200). In this regard, in some such embodiments, the trip plan management apparatus 308 is specially configured by computer-coded instructions (e.g., computer program instructions) stored thereon, for example in the data storage circuitry 404 and/or another component depicted and/or described herein and/or otherwise accessible to the trip plan management apparatus 308, for performing the operations as depicted and described.

In some embodiments, the trip plan management apparatus 308 is in communication with one or more external apparatuses, systems, devices, and/or the like, to perform one or more of the operations as depicted and described. For example, the trip plan management apparatus 308 in some embodiments is in communication with an entity computing device, one or more external systems, and/or the like. It will be appreciated that while the process 800 is described as performed by and from the perspective of the trip plan management apparatus 308 for purposes of simplifying the description, the process 800 may also be performed, in total or in part, by the vehicle apparatus 200 in conjunction with the onboard trip activity manager 326.

The process 800 begins at operation 802. At operation 802, the trip plan management apparatus 308 includes means such as the processing circuitry 402, the data storage circuitry 404, the input/output circuitry 406, the communication circuitry 408, the remote vehicle control circuitry 410, the mission management circuitry 412, the fleet management circuitry 414, the ML model circuitry 416, and/or the like, or a combination thereof, that receives, based on interactions with a cloud-based user interface associated with a trip plan management system 306, a plurality of trip activity requests 304*a-n* associated with a plurality of entities generated a plurality of respective entity computing devices 302*a-n*.

At operation 804, the trip plan management apparatus 308 includes means such as the processing circuitry 402, the data storage circuitry 404, the input/output circuitry 406, the communication circuitry 408, the remote vehicle control circuitry 410, the mission management circuitry 412, the fleet management circuitry 414, the ML model circuitry 416, and/or the like, or a combination thereof, that generates, based on the plurality of trip activity requests 304*a-n*, a plurality of trip activities 312*a-n*, wherein the plurality of trip activities 312*a-n* comprises at least a first trip activity 312*a* associated with a first entity of the plurality of entities and a second trip activity 312*b* associated with a second entity of the plurality of entities, and wherein each respective trip activity 312*a-n* is associated with at least one of a condition set 314, an action sequence 316, and/or an entity-selected encryption model 318.

At operation 806, the trip plan management apparatus 308 includes means such as the processing circuitry 402, the data storage circuitry 404, the input/output circuitry 406, the communication circuitry 408, the remote vehicle control circuitry 410, the mission management circuitry 412, the fleet management circuitry 414, the ML model circuitry 416, and/or the like, or a combination thereof, that generates a trip plan based on the plurality of trip activities 312*a-n*, wherein generating the trip plan comprises determining, based on a plurality of trip activity parameters associated with each respective trip activity of the plurality of trip activities 312*a-n*, that at least the first trip activity 312*a* and the second trip activity 312*b* can be feasibly executed during the trip plan.

At operation 808, the trip plan management apparatus 308 includes means such as the processing circuitry 402, the data storage circuitry 404, the input/output circuitry 406, the communication circuitry 408, the remote vehicle control circuitry 410, the mission management circuitry 412, the fleet management circuitry 414, the ML model circuitry 416, and/or the like, or a combination thereof, that generates at least a first rule set based on the plurality of trip activities 312*a-n*, wherein the first rule set is generated based on at least one of the condition set 314 or the action sequence 316 associated with at least one of the first trip activity 312*a* or the second trip activity 312*b*.

At operation 810, the trip plan management apparatus 308 includes means such as the processing circuitry 402, the data storage circuitry 404, the input/output circuitry 406, the communication circuitry 408, the remote vehicle control circuitry 410, the mission management circuitry 412, the fleet management circuitry 414, the ML model circuitry 416, and/or the like, or a combination thereof, that causes the vehicle 112 to execute the trip plan based on the first rule set by inputting the trip plan and the first rule set into the vehicle 112.

Figure 9:
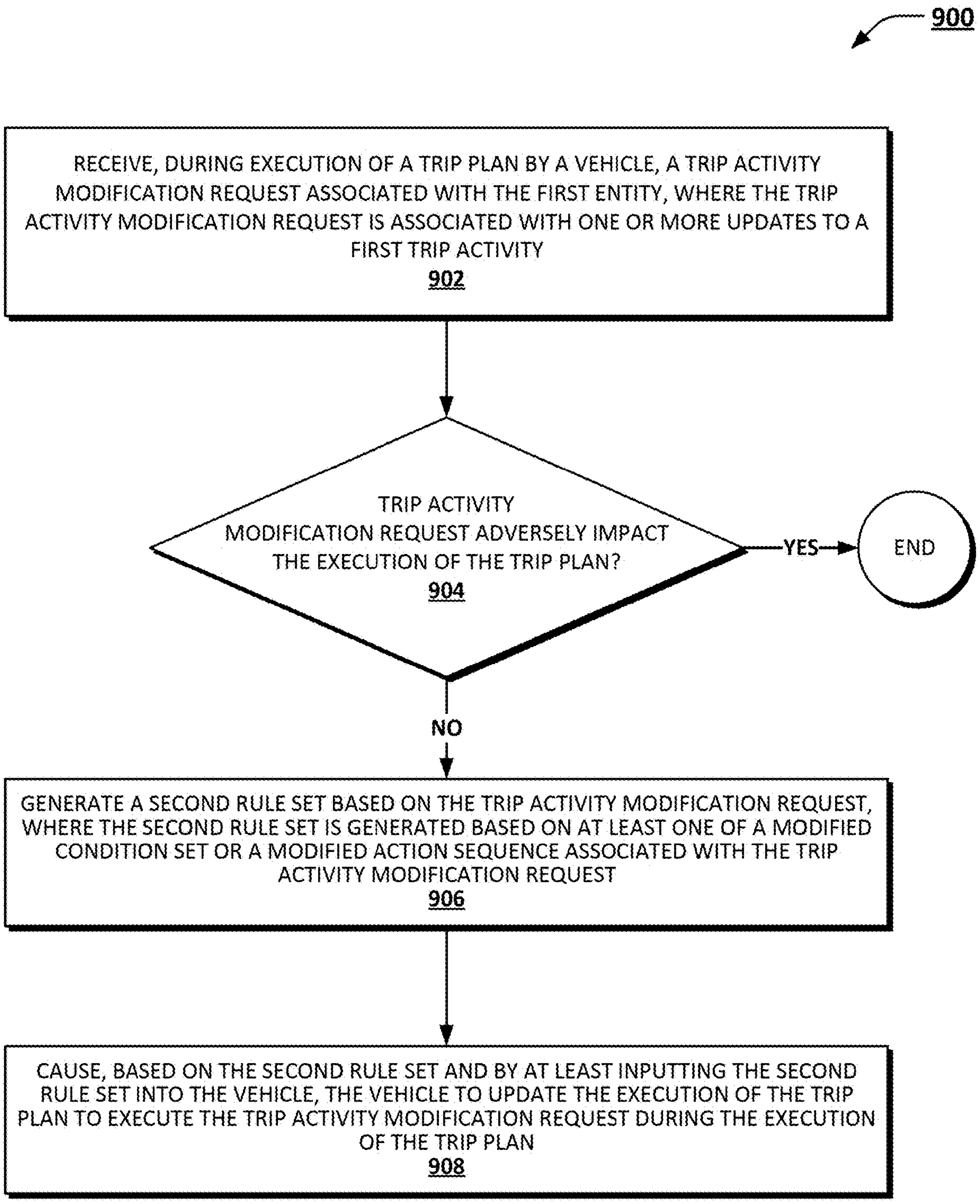
FIG. 9 illustrates another flowchart depicting example operations of an example process for providing adaptive trip activity and data security management for multiple respective entities in accordance with at least some example embodiments of the present disclosure.

FIG. 9 illustrates another flowchart depicting example operations of an example process for providing adaptive trip activity and data security management for multiple respective entities in accordance with at least some example embodiments of the present disclosure. In some embodiments, the process 900 is embodied by a computer-implemented process executable by any of a myriad of computing devices, apparatuses, systems, and/or the like as described herein. Additionally or alternatively, in some embodiments, the process 900 is embodied by computer program code stored on a non-transitory computer-readable storage medium of a computer program product configured for execution to perform the process as depicted and described.

Additionally or alternatively, in some embodiments, the process 900 is performed by one or more specially configured computing devices, such as the trip plan management apparatus 308 alone or in communication with one or more other components, devices, systems, and/or the like (e.g., such as the vehicle apparatus 200). In this regard, in some such embodiments, the trip plan management apparatus 308 is specially configured by computer-coded instructions (e.g., computer program instructions) stored thereon, for example in the data storage circuitry 404 and/or another component depicted and/or described herein and/or otherwise accessible to the trip plan management apparatus 308, for performing the operations as depicted and described.

In some embodiments, the trip plan management apparatus 308 is in communication with one or more external apparatuses, systems, devices, and/or the like, to perform one or more of the operations as depicted and described. For example, the trip plan management apparatus 308 in some embodiments is in communication with an entity computing device, one or more external systems, and/or the like. It will be appreciated that while the process 900 is described as performed by and from the perspective of the trip plan management apparatus 308 for purposes of simplifying the description, the process 900 may also be performed, in total or in part, by the vehicle apparatus 200 in conjunction with the onboard trip activity manager 326.

The process 900 begins at operation 902. At operation 902, the trip plan management apparatus 308 includes means such as the processing circuitry 402, the data storage circuitry 404, the input/output circuitry 406, the communication circuitry 408, the remote vehicle control circuitry 410, the mission management circuitry 412, the fleet management circuitry 414, the ML model circuitry 416, and/or the like, or a combination thereof, that receives, during execution of a trip plan by a vehicle 112, a trip activity modification request 512 associated with a first entity, wherein the trip activity modification request 512 is associated with one or more updates to a first trip activity 312*a*.

At operation 904, the trip plan management apparatus 308 includes means such as the processing circuitry 402, the data storage circuitry 404, the input/output circuitry 406, the communication circuitry 408, the remote vehicle control circuitry 410, the mission management circuitry 412, the fleet management circuitry 414, the ML model circuitry 416, and/or the like, or a combination thereof, that determines whether the trip activity modification request 512 adversely impacts the execution of the trip plan by the vehicle 112.

At operation 906, the trip plan management apparatus 308 includes means such as the processing circuitry 402, the data storage circuitry 404, the input/output circuitry 406, the communication circuitry 408, the remote vehicle control circuitry 410, the mission management circuitry 412, the fleet management circuitry 414, the ML model circuitry 416, and/or the like, or a combination thereof, that, in response to determining that the trip activity modification request 512 does not adversely impact the execution of the trip plan by the vehicle 112, generates a second rule set based on the trip activity modification request 512, wherein the second rule set is generated based on at least one of a modified condition set or a modified action sequence associated with the trip activity modification request 512.

At operation 908, the trip plan management apparatus 308 includes means such as the processing circuitry 402, the data storage circuitry 404, the input/output circuitry 406, the communication circuitry 408, the remote vehicle control circuitry 410, the mission management circuitry 412, the fleet management circuitry 414, the ML model circuitry 416, and/or the like, or a combination thereof, that causes, based on the second rule set and by at least inputting the second rule set into the vehicle 112, the vehicle 112 to update the execution of the trip plan to execute the trip activity modification request 512 during the execution of the trip plan.

CONCLUSION

While several example contexts are described herein with respect to processing of data by an aerial vehicle, it will be appreciated in view of this disclosure that embodiments may include or otherwise be implemented as a part of other vehicles, devices, and/or the like. For example, in other contexts, embodiments of the present disclosure utilize sensors of and/or display data to displays of other types of vehicles, including ground vehicles. Additionally or alternatively, some embodiments utilize sensors of and/or display data to displays of other devices, including user devices, back-end computing devices, and/or the like. Indeed, in some embodiments, the sensors, computing devices, and/or displays are embodied and/or otherwise included in one or more computing devices not integrated as part of any vehicle (e.g., as a standalone computing device). In is intended that all such contexts, device types, and/or the like be included within the scope of this disclosure and covered within the scope of the claims appended herein.

Although an example processing system has been described above, implementations of the subject matter and the functional operations described herein may be implemented in other types of digital electronic circuitry, or in computer software, firmware, or hardware, including the structures disclosed in this specification and their structural equivalents, or in combinations of one or more of them.

Embodiments of the subject matter and the operations described herein may be implemented in digital electronic circuitry, or in computer software, firmware, or hardware, including the structures disclosed in this specification and their structural equivalents, or in combinations of one or more of them. Embodiments of the subject matter described herein may be implemented as one or more computer programs, i.e., one or more modules of computer program instructions, encoded on computer storage medium for execution by, or to control the operation of, information/data processing apparatus. Alternatively, or in addition, the program instructions may be encoded on an artificially generated propagated signal, e.g., a machine-generated electrical, optical, or electromagnetic signal, which is generated to encode information/data for transmission to suitable receiver apparatus for execution by an information/data processing apparatus. A computer storage medium may be, or be included in, a computer-readable storage device, a computer-readable storage substrate, a random or serial access memory array or device, or a combination of one or more of them. Moreover, while a computer storage medium is not a propagated signal, a computer storage medium may be a source or destination of computer program instructions encoded in an artificially generated propagated signal. The computer storage medium may also be, or be included in, one or more separate physical components or media (e.g., multiple CDs, disks, or other storage devices).

The operations described herein may be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus may include special purpose logic circuitry, e.g., an FPGA (field programmable gate array) or an ASIC (application-specific integrated circuit). The apparatus may also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment may realize various different computing model infrastructures, such as web services, distributed computing and grid computing infrastructures.

A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program may be deployed to be executed on one computer or on multiple computers that are located at one site or distributed across multiple sites and interconnected by a communication network.

The processes and logic flows described herein may be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, embodiments of the subject matter described herein may be implemented on a computer having a display device, e.g., a CRT (cathode ray tube) or LCD (liquid crystal display) monitor, for displaying information/data to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input. In addition, a computer may interact with a user by sending documents to and receiving documents from a device that is used by the user; for example, by sending web pages to a web browser on a user's client device in response to requests received from the web browser.

Embodiments of the subject matter described herein may be implemented in a computing system that includes a back-end component, e.g., as an information/data server, or that includes a middleware component, e.g., an application server, or that includes a front-end component, e.g., a client computer having a graphical user interface or a web browser through which a user may interact with an implementation of the subject matter described herein, or any combination of one or more such back-end, middleware, or front-end components. The components of the system may be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system may include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) may be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Thus, particular embodiments of the subject matter have been described. Other embodiments are within the scope of the following claims. In some cases, the actions recited in the claims may be performed in a different order and still achieve desirable results. In addition, the processes depicted in the accompanying figures do not necessarily require the particular order shown, or sequential order, to achieve desirable results.

What is claimed is:

1. A computer-implemented method, the computer-implemented method comprising:

extracting a plurality of trip activity requests associated with a plurality of entity computing devices, wherein the plurality of entity computing devices comprises a first entity computing device located at a first location and a second entity computing device located at a second location;

retrieving, based on the plurality of trip activity requests, a plurality of trip activities, wherein the plurality of trip activities comprises at least a first trip activity associated with the first entity computing device and a second trip activity associated with the second entity computing device;

obtaining a trip plan based on the plurality of trip activities, wherein generating the trip plan comprises inputting a plurality of trip activity parameters associated with each respective trip activity of the plurality of trip activities into a trip plan management apparatus to determine that at least the first trip activity and the second trip activity can be executed during the trip plan;

causing an autonomous vehicle to execute the trip plan based on a first rule set associated with the plurality of trip activities, wherein causing the autonomous vehicle to execute the trip plan comprises a rules engine of the autonomous vehicle receiving the trip plan and the first rule set, wherein the rules engine is configured to evaluate a current vehicle state of the autonomous vehicle to determine whether one or more rule conditions associated with the first rule set have been satisfied, and in response to determining that the one or more rule conditions have been satisfied, trigger execution of one or more actions of an action sequence associated with a respective trip activity of the plurality of trip activities, wherein a command executor of the autonomous vehicle is configured to control one or more vehicle systems of the autonomous vehicle to execute the one or more actions;

receiving, in response to the execution of the trip plan, first trip activity data indicative of whether the first trip activity has met or exceeded a first minimum quality criteria;

receiving, in response to the execution of the trip plan, second trip activity data indicative of whether the second trip activity has met or exceeded a second minimum quality criteria;

configuring a first entity encryption model based on a first model configuration indication received from the first entity computing device;

configuring a second entity encryption model based on a second model configuration indication received from the second entity computing device, wherein the first entity encryption model is different from the second entity encryption model;

inputting the first trip activity data into the first entity encryption model to encrypt the first trip activity data;

inputting the second trip activity data into the second entity encryption model to encrypt the second trip activity data; and transmitting the encrypted first trip activity data to the first entity computing device and the encrypted second activity data to the second entity computing device.

2. The computer-implemented method of claim 1, wherein each respective trip activity of the plurality of trip activities is associated with a condition set.

3. The computer-implemented method of claim 1, wherein the plurality of encryption models comprises at least one of a symmetric encryption model, an asymmetric encryption model, a block cypher encryption model, a stream cipher encryption model, or an image encryption model.

4. The computer-implemented method of claim 1, wherein the computer-implemented method further comprises:

receiving, during the execution of the trip plan, a trip activity modification request associated with the first entity computing device, wherein the trip activity modification request is associated with one or more updates to the first trip activity; and in response to determining that the trip activity modification request does not adversely impact the execution of the trip plan by the autonomous vehicle:

generating a second rule set based on the trip activity modification request, wherein the second rule set is generated based on at least one of a modified condition set or a modified action sequence associated with the trip activity modification request; and causing, based on the second rule set and by at least inputting the second rule set into the autonomous vehicle, the autonomous vehicle to update the execution of the trip plan to execute the trip activity modification request during the execution of the trip plan.

5. The computer-implemented method of claim 1, wherein the computer-implemented method further comprises:

causing a second vehicle to execute a second trip plan based on a second rule set by inputting the second trip plan and the second rule set into the second vehicle, wherein the second trip plan and the second rule set are generated based on determining a first subset of trip activities of the plurality of trip activities that can be executed during the second trip plan; and causing a third vehicle to execute a third trip plan based on a third rule set by inputting the third trip plan and the third rule set into the third vehicle, wherein the third trip plan and the third rule set are generated based on determining a second subset of trip activities of the plurality of trip activities that can be executed during the third trip plan.

6. The computer-implemented method of claim 1, wherein the plurality of trip activity parameters associated with each respective trip activity of the plurality of trip activities comprise at least one of a date and time, a geographic region, preferred weather conditions, vehicle hardware requirements, or vehicle sensor requirements associated with each respective trip activity of the plurality of trip activities.

7. The computer-implemented method of claim 1, wherein the first rule set is associated with a plurality of executable program code segments, wherein a first executable program code segment of the plurality of executable program code segments is configured to be executed by the rules engine of the autonomous vehicle to perform at least one action in the set of actions.

8. The computer-implemented method of claim 1, wherein the autonomous vehicle comprises a connection manager configured to switch from a first communication system to a second communication system based on a signal strength associated with the first communication system.

9. The computer-implemented method of claim 1, wherein the first encryption model comprises a block cypher encryption model and the second encryption model comprises an image encryption model.

10. The computer-implemented method of claim 1, wherein the first entity computing device is configured to generate a first public key and a first private key corresponding to the first encryption model and the second entity computing device is configured to generate a second public key and a second private key corresponding to the second encryption model.

11. The computer-implemented method of claim 1, further comprising:

storing the encrypted first trip activity data in a first entity-specific encryption database exclusively accessible by the first entity computing device and the encrypted second trip activity data in a second entity-specific encryption database exclusively accessible by the second entity computing device.

12. The computer-implemented method of claim 1, further comprising:

determining that the first trip activity data comprises an amount of data that meets or exceeds a data size threshold; and in response to determining that the first trip activity data comprises an amount of data that meets or exceeds the data size threshold, encrypting a second portion of the first trip activity data using a third entity encryption model.

13. The computer-implemented method of claim 1, wherein the first model configuration indication is received via a first interface rendered on the first entity computing device and the second model configuration indication is received via a second interface rendered on the second entity computing device.

14. The computer-implemented method of claim 1, wherein the first trip activity data is encrypted by a data encryption manager of an onboard trip activity manager of the autonomous vehicle as part of an action postcondition associated with the action sequence associated with the first trip activity, and wherein the encrypted first trip activity data is stored in a first entity-specific encryption database of the autonomous vehicle.

15. The computer-implemented method of claim 1, further comprising:

in response to determining that the first trip activity data has not met the first minimum quality criteria, re-initiating, by an onboard trip activity manager of the autonomous vehicle, one or more portions of the action sequence associated with the first trip activity.

16. An apparatus comprising:

at least one processor; and at least one non-transitory memory storing instructions that, when executed by the at least one processor, cause the apparatus to:

extract a plurality of trip activity requests associated with a plurality of entity computing devices, wherein the plurality of entity computing devices comprises a first entity computing device located at a first location and a second entity computing device located at a second location;

retrieve, based on the plurality of trip activity requests, a plurality of trip activities, wherein the plurality of trip activities comprises at least a first trip activity associated with the first entity computing device and a second trip activity associated with the second entity computing device;

obtain a trip plan based on the plurality of trip activities, wherein generating the trip plan comprises inputting a plurality of trip activity parameters associated with each respective trip activity of the plurality of trip activities into a trip plan management apparatus to determine that at least the first trip activity and the second trip activity can be executed during the trip plan;

cause an autonomous vehicle to execute the trip plan based on a first rule set associated with the plurality of trip activities, wherein causing the autonomous vehicle to execute the trip plan comprises a rules engine of the autonomous vehicle receiving the trip plan and the first rule set, wherein the rules engine is configured to evaluate a current vehicle state of the autonomous vehicle to determine whether one or more rule conditions associated with the first rule set have been satisfied, and in response to determining that the one or more rule conditions have been satisfied, trigger execution of one or more actions of an action sequence associated with a respective trip activity of the plurality of trip activities, wherein a command executor of the autonomous vehicle is configured to control one or more vehicle systems of the autonomous vehicle to execute the one or more actions;

receive, in response to the execution of the trip plan, first trip activity data indicative of whether the first trip activity has met or exceeded a first minimum quality criteria;

receive, in response to the execution of the trip plan, second trip activity data indicative of whether the second trip activity has met or exceeded a second minimum quality criteria;

configure a first entity encryption model based on a first model configuration indication received from the first entity computing device;

configure a second entity encryption model based on a second model configuration indication received from the second entity computing device, wherein the first entity encryption model is different from the second entity encryption model;

input the first trip activity data into the first entity encryption model to encrypt the first trip activity data;

input the second trip activity data into the second entity encryption model to encrypt the second trip activity data; and transmit the encrypted first trip activity data to the first entity computing device and the encrypted second activity data to the second entity computing device.

17. The apparatus of claim 16, wherein each respective trip activity of the plurality of trip activities is associated with a condition set.

18. The apparatus of claim 16, wherein the instructions further cause the apparatus to:

receive, during execution of the trip plan, a trip activity modification request associated with the first entity computing device, wherein the trip activity modification request is associated with one or more updates to the first trip activity; and in response to determining that the trip activity modification request does not adversely impact the execution of the trip plan by the autonomous vehicle:

generate a second rule set based on the trip activity modification request, wherein the second rule set is generated based on at least one of a modified condition set or a modified action sequence associated with the trip activity modification request; and cause, based on the second rule set and by at least inputting the second rule set into the autonomous vehicle, the autonomous vehicle to update the execution of the trip plan to execute the trip activity modification request during the execution of the trip plan.

19. The apparatus of claim 16, wherein the instructions further cause the apparatus to:

cause a second vehicle to execute a second trip plan based on a second rule set by inputting the second trip plan and the second rule set into the second vehicle, wherein the second trip plan and the second rule set are generated based on determining a first subset of trip activities of the plurality of trip activities that can be executed during the second trip plan; and cause a third vehicle to execute a third trip plan based on a third rule set by inputting the third trip plan and the third rule set into the third vehicle, wherein the third trip plan and the third rule set are generated based on determining a second subset of trip activities of the plurality of trip activities that can be executed during the third trip plan.

20. A computer program product comprising at least one non-transitory computer-readable storage medium having computer program code stored thereon that, in execution with at least one processor, is configured to:

extract a plurality of trip activity requests associated with a plurality of entity computing devices, wherein the plurality of entity computing devices comprises a first entity computing device located at a first location and a second entity computing device located at a second location;

retrieve, based on the plurality of trip activity requests, a plurality of trip activities, wherein the plurality of trip activities comprises at least a first trip activity associated with the first entity computing device and a second trip activity associated with the second entity computing device;

obtain a trip plan based on the plurality of trip activities, wherein generating the trip plan comprises inputting a plurality of trip activity parameters associated with each respective trip activity of the plurality of trip activities into a trip plan management apparatus to determine that at least the first trip activity and the second trip activity can be executed during the trip plan;

cause an autonomous vehicle to execute the trip plan based on a first rule set associated with the plurality of trip activities, wherein causing the autonomous vehicle to execute the trip plan comprises a rules engine of the autonomous vehicle receiving the trip plan and the first rule set, wherein the rules engine is configured to evaluate a current vehicle state of the autonomous vehicle to determine whether one or more rule conditions associated with the first rule set have been satisfied, and in response to determining that the one or more rule conditions have been satisfied, trigger execution of one or more actions of an action sequence associated with a respective trip activity of the plurality of trip activities, wherein a command executor of the autonomous vehicle is configured to control one or more vehicle systems of the autonomous vehicle to execute the one or more actions;

receive, in response to the execution of the trip plan, first trip activity data indicative of whether the first trip activity has met or exceeded a first minimum quality criteria;

receive, in response to the execution of the trip plan, second trip activity data indicative of whether the second trip activity has met or exceeded a second minimum quality criteria;

configure a first entity encryption model based on a first model configuration indication received from the first entity computing device;

configure a second entity encryption model based on a second model configuration indication received from the second entity computing device, wherein the first entity encryption model is different from the second entity encryption model;

input the first trip activity data into the first entity encryption model to encrypt the first trip activity data;

input the second trip activity data into the second entity encryption model to encrypt the second trip activity data; and transmit the encrypted first trip activity data to the first entity computing device and the encrypted second activity data to the second entity computing device.

* * * * *